(12) United States Patent
Jiang et al.

(10) Patent No.: US 7,590,513 B2
(45) Date of Patent: Sep. 15, 2009

(54) AUTOMATED MODELING AND TRACKING OF TRANSACTION FLOW DYNAMICS FOR FAULT DETECTION IN COMPLEX SYSTEMS

(75) Inventors: Guofei Jiang, Princeton, NJ (US); Haifeng Chen, Piscataway, NJ (US); Cristian Ungureanu, Princeton, NJ (US); Kenji Yoshihira, Cranford, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 522 days.

(21) Appl. No.: 11/275,796

(22) Filed: Jan. 30, 2006

(65) Prior Publication Data

US 2007/0179746 A1  Aug. 2, 2007

(51) Int. Cl.
*G06F 17/10* (2006.01)
(52) U.S. Cl. ............................................. 703/2; 714/48
(58) Field of Classification Search .................. 703/2; 714/48
See application file for complete search history.

(56) References Cited

U.S. PATENT DOCUMENTS

| | | | | |
|---|---|---|---|---|
| 5,659,593 | A * | 8/1997 | Tzvieli ........................... | 379/13 |
| 6,597,777 | B1 * | 7/2003 | Ho .............................. | 379/133 |
| 7,096,074 | B2 * | 8/2006 | Yulevitch et al. .............. | 700/21 |
| 2005/0193281 | A1 * | 9/2005 | Ide et al. ....................... | 714/47 |

OTHER PUBLICATIONS

Irina Rish et al., "Adaptive Diagnosis in Adaptive Systems", Sep. 2005, IEEE Transactions on Neural Networks, vol. 16, issue 5, pp. 1088-1109.*

Marcos K. Aguilera et al., "Performance Debugging for distributed systems of black boxes", 2003, Proceedings of the nineteenth ACM symposium on operating systems principles, pp. 74-89.*

Guofei Jiang, "Robust process detection using nonparametric weak models", Mar. 2005, Internation Journal Of Intelligent Control and Systems, vol. 10, No. 10, pp. 33-42.*

Guofei Jiang et al., "Modeling and tracking of transaction flow dynamics for fault detection in complex systems", Oct. 2006, IEEE Transactions on Dependable and Secure Computing, vol. 3, No. 4, pp. 312-326.*

Guofei Jiang et al., "Efficient and scalable algorithms for inferring likely invariants in distributed systems", Oct. 2006, IEEE Transactions on Knowledge and Data Engineering, vol. 19, No. 11, pp. 1508-1523.*

Haifeng Chen et al., "Failure Detection and localization in component based systems by online tracking", Aug. 21, 2005, Proceedings of the eleventh ACM SIGKDD international conference on knowledge discovery in data mining, pp. 750-755.*

Mario A.T. Figueiredo et al., "Unsupervised Learning of Finite Mixture Models", Mar. 2002, IEEE Transactions on Pattern Analysis and Machine Intelligence, vol. 24, issue 3, pp. 381-396.*

(Continued)

*Primary Examiner*—Paul L Rodriguez
*Assistant Examiner*—Russ Guill
(74) *Attorney, Agent, or Firm*—Paul Schwarz; Joseph J. Kolodka

(57) ABSTRACT

A method and system that automatically derives models between monitored quantities under non-faulty conditions so that subsequent faults can be detected as deviations from the derived models. The invention identifies unusual conditions for fault detection and isolation that is absent in rule-based systems.

18 Claims, 15 Drawing Sheets

OTHER PUBLICATIONS

Rolf Johansson, "System Modeling and Identification", 1993, Prentice Hall, pp. 200-206.*

L.L. Ho et al., "Adaptive Network/Service Fault Detection in Transaction-Oriented Wide Area Networks", 1999, Proceedings of the Sixth IFIP/IEEE International Symposium on Integrated Network Management, pp. 761-775.*

T.K. Moon, "The expectation-maximization algorithm", 1996, IEEE Signal Processing Magazine, pp. 47-60.*

A. Bernieri et al., "A Neural Network Approach for Identification and Fault Diagnosis on Dynamic Systems", 1994, IEEE Transactions on Instrumentation and Measurement, vol. 43, No. 6, pp. 867-873.*

R. Isermann et al., "Trends in the application of model-based fault diagnosis of technical processes", 1997, Control Engineering Practice, vol. 5, No. 5, pp. 709-719.*

H. Hajji, "Baselining network traffic and online faults detection", May 2003, IEEE International Conference on Communications, pp. 301-308.*

* cited by examiner

AUTOMATED MODELING AND TRACKING OF TRANSACTION FLOW DYNAMICS FOR FAULT DETECTION IN COMPLEX SYSTEMS

BACKGROUND

The invention relates generally to the field of fault detection and localization in complex systems. More specifically, embodiments of the invention relate to methods and systems for automatically modeling transaction flow dynamics in distributed transaction systems for fault detection and localization.

Today, numerous Internet services such as Amazon, eBay and Google have changed the traditional business model. With the abundance of Internet services, there are unprecedented needs to ensure their operational availability and reliability. Minutes of service downtime can lead to severe revenue loss and user dissatisfaction.

An information system for an Internet service is typically large, dynamic, and distributed and can comprise thousands of individual hardware and software components. A single failure in one component, whether hardware or software related, can cause an entire system to be unavailable. Studies have shown that the time taken to detect, localize, and isolate faults contributes to a large portion of the time to recover from a failure.

Transaction systems with user requests, such as Internet services and others, receive large numbers of transaction requests from users everyday. These requests flow through sets of components according to specific application software logic. With such a large volume of user visits, it is unrealistic to monitor and analyze each individual user request.

Data from software log files, system audit events, network traffic statistics, etc., can be collected from system components and used for fault analysis. Since operational systems are dynamic, this data is the observable of their internal states. Given the distributed nature of information systems, evidence of fault occurrence is often scattered among the monitored data.

Advanced monitoring and management tools for system administrators to interpret monitoring data are available. IBM Tivoli, HP OpenView, and EMC InCharge suite are some of the products in the growing market of system management software. Most current tools support some form of data pre-processing and enable users to view the data with visualization functions. These tools are useful for a system administrator since it is impracticable to manually scan a large amount of monitoring data. However, these tools employ simple rule-based correlation with little embedded intelligence for reasoning.

Rule-based tools generate alerts based on violations of predetermined threshold values. Rule-based systems are therefore stateless and do not manage dynamic data analysis well. The lack of intelligence results from the difficulty in characterizing the dynamic behavior of complex systems. Characterization is inherently system-dependent in that it is difficult to generalize across systems with different architectures and functionality.

Detection and diagnosis of faults in complex information systems is a formidable task. Current approaches for fault diagnosis use event correlation which collects and correlates events to locate faults based on known dependencies between faults and symptoms. Due to the diversity of runtime environments, many faults experienced in an interconnected system are not very well understood. As a result, it is difficult to obtain precise fault-symptom dependencies.

One attempt at understanding relationships between system faults and symptoms was performed by the Berkeley/Stanford Recovery-Oriented Computing (ROC) group. JBoss middleware was modified to monitor traces in J2EE (Java2 Enterprise Edition) platforms. JBoss is an open source J2EE based application server implemented in pure Java. J2EE is a programming platform for developing and running distributed multi-tier architecture applications, based largely on modular components running on an application server. Two methods were developed to collect traces for fault detection and diagnosis. However, with the huge volume of user visits; to monitor, collect and analyze the trace of every user request was problematic. Most methods of collecting user request traces results in a large monitoring overhead.

It is a major challenge for system administrators to detect and isolate faults effectively in large and complex systems. The challenge is how to correlate the collected data effectively across a distributed system for observation, fault detection and identification. It is therefore desirable to develop a method and system that considers the mass characteristics of user requests in complex systems and has self-cognition capability to aid in fault analysis.

SUMMARY

Although there are various methods and systems that assist system administrators to detect and identify faults in complex systems, such methods and systems are not completely satisfactory. The inventors have discovered that it would be desirable to have a method and system that automatically derives models between monitored quantities so that subsequent faults between the monitored quantities can be detected as deviations from the derived models. The invention identifies unusual conditions for fault detection and identification that is absent in rule-based systems.

Distributed transaction systems comprise numerous computers that communicate with one another and appear to users as parts of a single, large, accessible storehouse of shared hardware, software, and data. Transaction flow dynamics represents the dynamic relationship between flow intensity measured at a plurality of measurement points across distributed transaction systems.

The invention considers the mass characteristics of user requests in distributed transaction systems and uses flow intensity measurements extracted from common and lightweight monitoring data. Flow intensity is defined as the intensity with which internal monitoring data reacts to the volume of user requests and is measured by the number of requests per sampling time. The invention monitors flow intensity at a plurality of points in a distributed transaction system. The monitored points reflect inputs and outputs of system segments between the points. The dynamic flow relationship that exists between flow intensity measurement points is monitored and is used to derive models of the segments lying between measurement points.

The invention comprises methods and systems that detect anomalies in component software and hardware using flow intensity monitoring data to characterize component behavior as a set of invariant models for analysis. The invention automatically derives models between monitored quantities under non-faulty conditions so that subsequent faults can be detected as deviations from the derived models. The models reflect flow dynamics that components of the transaction system should bear.

System identification methods are applied to receive flow intensity measurements and automatically learn models which characterize the dynamic flow relationships between measurement points. Relationship models such as ARX (AutoRegressive models with eXogenous inputs), Gaussian, and others are used to learn relationships. A fitness score is derived to evaluate how well the learned models fit observed data. If the modeled relationships hold over time, they are invariants of the transaction system. Based on the fitness score, a confidence score is derived representing how robust the model is.

The fault detection and isolation method of the invention uses the models to track transaction flow dynamics in real time using flow intensity monitoring data. The models are tracked—not the real measurements since the individual measurements are constantly changing due to varying user loads. Statistical residuals are derived and used to interpret the model outputs and monitoring data for fault detection.

One aspect of the invention provides methods for detecting faults in a distributed transaction system. Methods according to this aspect of the invention preferably start with receiving data corresponding to flow intensity measured at a plurality of monitoring points in the distributed transaction system during normal operation of the system, generating a model of flow dynamics in the distributed transaction system by automatically deriving a relationship that characterizes a normal flow intensity through a segment of the distributed transaction system and monitoring the distributed transaction system by detecting deviations from the generated model of flow dynamics.

Another aspect of the method is where the model of flow dynamics is validated by performing sequential testing inputting new flow intensity data to the derived relationship to derive a fitness score and where the fitness score is used to evaluate the credibility of the derived relationship as a confidence score.

Yet another aspect of the method is where the deviations from the generated model of flow dynamics are detected by deriving a residual by tracking conformance between observed flow intensity measurements for the segment and an output of the model for that segment.

Another aspect of the method is correlating the residual with its components to isolate transaction system faults.

Yet another aspect of the method of the invention is a computer program product comprising a machine-readable medium having computer-executable program instructions thereon including code means for causing a computer to perform a computerized method for detecting faults in a distributed transaction system. Methods according to this aspect of the invention preferably start with receiving data corresponding to flow intensity measured at a plurality of monitoring points in the distributed transaction system during normal operation of the system, organizing the received flow intensity data to characterize a plurality of segments between every two monitoring points where the segments comprise at least one component, deriving a relationship for each segment, calculating a fitness score for each relationship, sequentially testing each relationship for a predetermined period of time using flow intensity data to validate each relationship as a model based on whether each relationship fitness score for a model is above a predetermined fitness threshold for the predetermined period of time, calculating a confidence score for each model by counting the number of times the fitness score for each model is higher than the fitness threshold, using the model for fault detection so long as the confidence score for the model is above a predetermined confidence threshold, updating the confidence score for each model over time, deriving a residual for each model by tracking conformance between observed flow intensity measurements for each segment and an output of each model for that segment, using the confidence score for a model to evaluate how credible the residual is for that model when used for fault detection, and correlating each residual with its components to detect and isolate transaction system faults.

Other objects and advantages of the methods and systems will become apparent to those skilled in the art after reading the detailed description of the preferred embodiments.

DETAILED DESCRIPTION OF THE PREFERRED EMBODIMENTS

Figure 1:
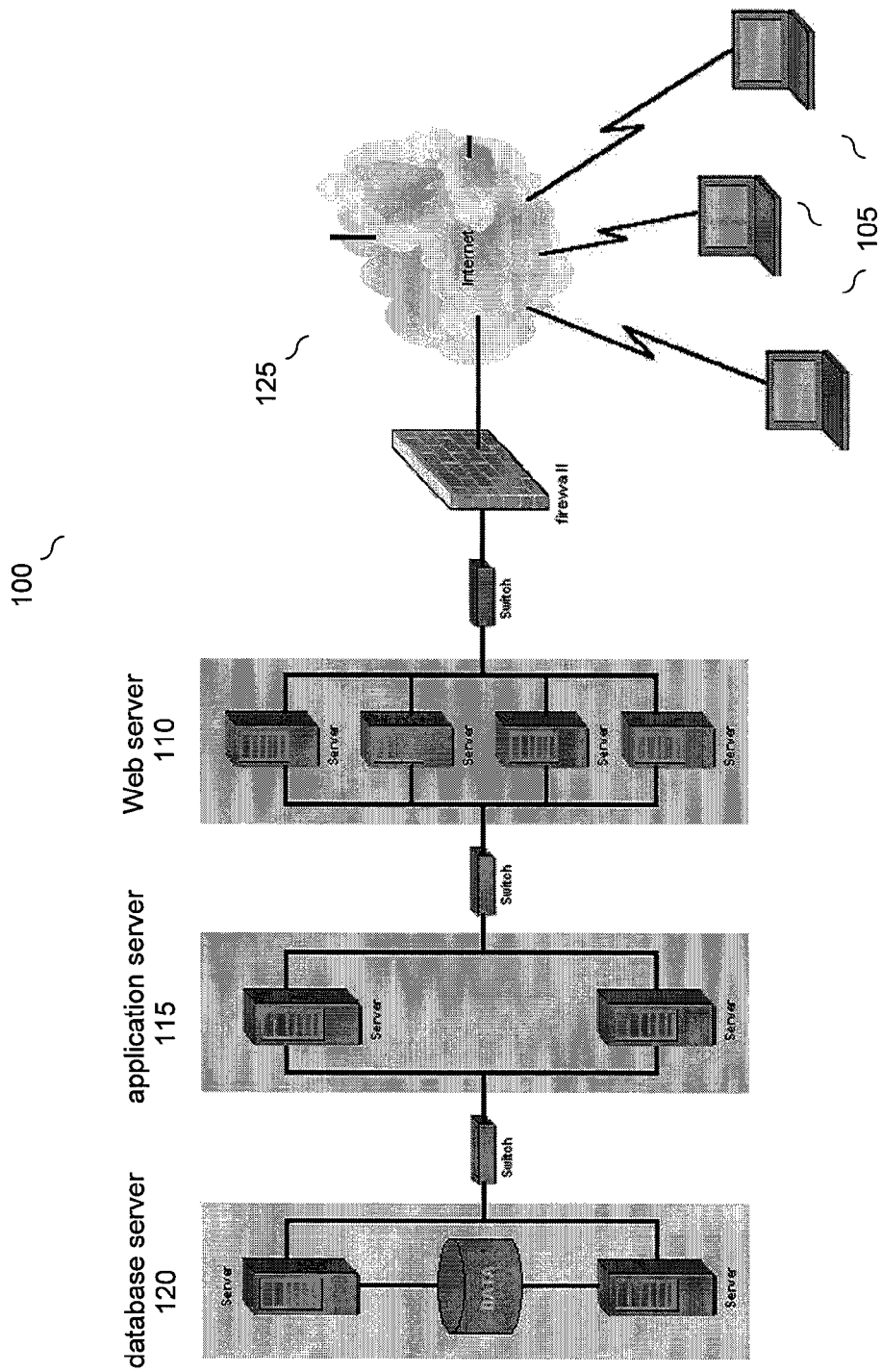
FIG. 1 is a diagram of an exemplary 3-tier eCommerce distributed transaction system.

Embodiments of the invention will be described with reference to the accompanying drawing figures wherein like numbers represent like elements throughout. Further, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

It should be noted that the invention is not limited to any particular software language described or implied in the figures. One of skill in the art will understand that a variety of alternative software languages may be used for implementation of the invention. It should also be understood that some components and items are illustrated and described as if they were hardware elements, as is common practice within the art. However, one of ordinary skill in the art, and based on a reading of this detailed description, would understand that, in at least one embodiment, components in the method and system may be implemented in software or hardware.

Embodiments of the invention provide methods, systems, and a computer-usable medium storing computer-readable instructions for a model-based, fault detection and localization method and system for distributed transaction systems that automatically derives models of correlation between monitored quantities under non-faulty conditions so that subsequent faults can be detected as deviations from the derived models. The invention tracks transaction flow dynamics in real time and uses statistical residuals to interpret the monitoring data for fault detection. The invention provides self-identification of unusual conditions that is absent in a rule-based systems.

In one embodiment, the invention is deployed as a network-enabled framework and is accessed through a graphical user interface (GUI). The application code resides on a server or a plurality of servers and is accessed by users via a client application, such as a Web browser (Mozilla Firefox, Netscape, Microsoft Internet Explorer, and others) or via another client access software application that is not a general-purpose browser. This access takes place over a distributed system using custom or standard Internet languages and protocols, and may involve scripting languages including HTML (Hypertext Markup Language), dynamic HTML (DHTML), Microsoft VBScript (Visual Basic Scripting Edition), Jscript, ActiveX and Java. A user's client application contacts a server hosting the application. The server sends information to the client application which displays the results to the user.

The invention is a modular framework and is deployed as software as an application program tangibly embodied on a program storage device. The application code for execution can reside on a plurality of different types of computer readable media known to those skilled in the art. Users access the framework by accessing the GUI via a computer.

A communications network can be a single network or a combination of communications networks including any wireline, wireless, broadband, switched, packet or other type of network through which voice or data communications may be accomplished. Networks allow more than one user to work and communicate together and share resources with one another. Aside from distributed processing, a network provides centralized storage capability, security and access to resources.

A distributed transaction system is a structure in which network resources, such as switching equipment and processors are distributed throughout a geographical area being served and where processing is shared by many different parts of the network. A distributed transaction system includes both communications and processing.

Shown in FIG. 1 is a distributed transaction system 100. Processing may be shared by client (local) computers 105, file servers, Web servers, application servers and database servers. Switching may be performed by electronic, optical, or electromechanical devices. The capability of individual computers being linked together as a network is familiar to one skilled in the art.

Most distributed transaction systems, such as Internet services, employ multi-tier architectures to integrate their components. Referring to FIG. 1, a typical three-tier architecture is shown which includes Web servers (Web tier) 110, application servers (middleware) 115 and database servers (database tier) 120. Individual computers 105 at a plurality of locations can communicate with a plurality of Web servers 110, which in turn communicate with other servers such as application 115 and database 120 servers.

The Web server 110 acts as an interface, or gateway, to present data to a client's browser. The application server 115 supports specific business, or application logic for various applications which generally includes the bulk of an application. The back-end database server 120 is used for persistent data storage.

Each tier can be built from a number of software packages running on servers (computers) which provide similar functionality. Packages such as Apache and IIS for the Web server, WebLogic and WebSphere for the application server, Oracle and DB2 for the database server, and others.

Distributed transaction systems receive millions of user visits per day. User requests traverse a set of components and software paths according to application logic. With such a large number of user visits, it is unrealizable to track each user request to verify its correctness.

Figure 2:
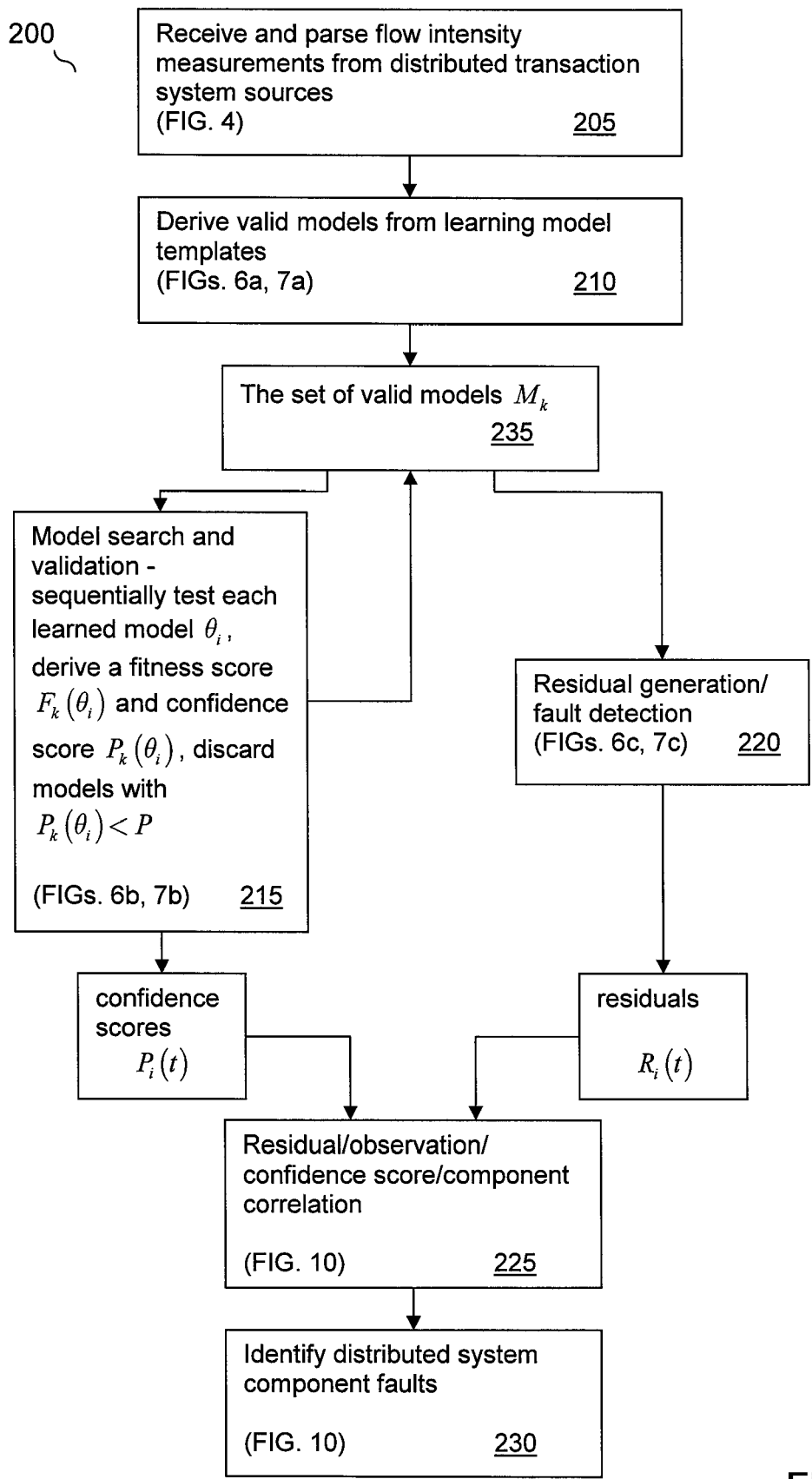
FIG. 2 is a block diagram of an exemplary method according to the invention.
Figure 3:
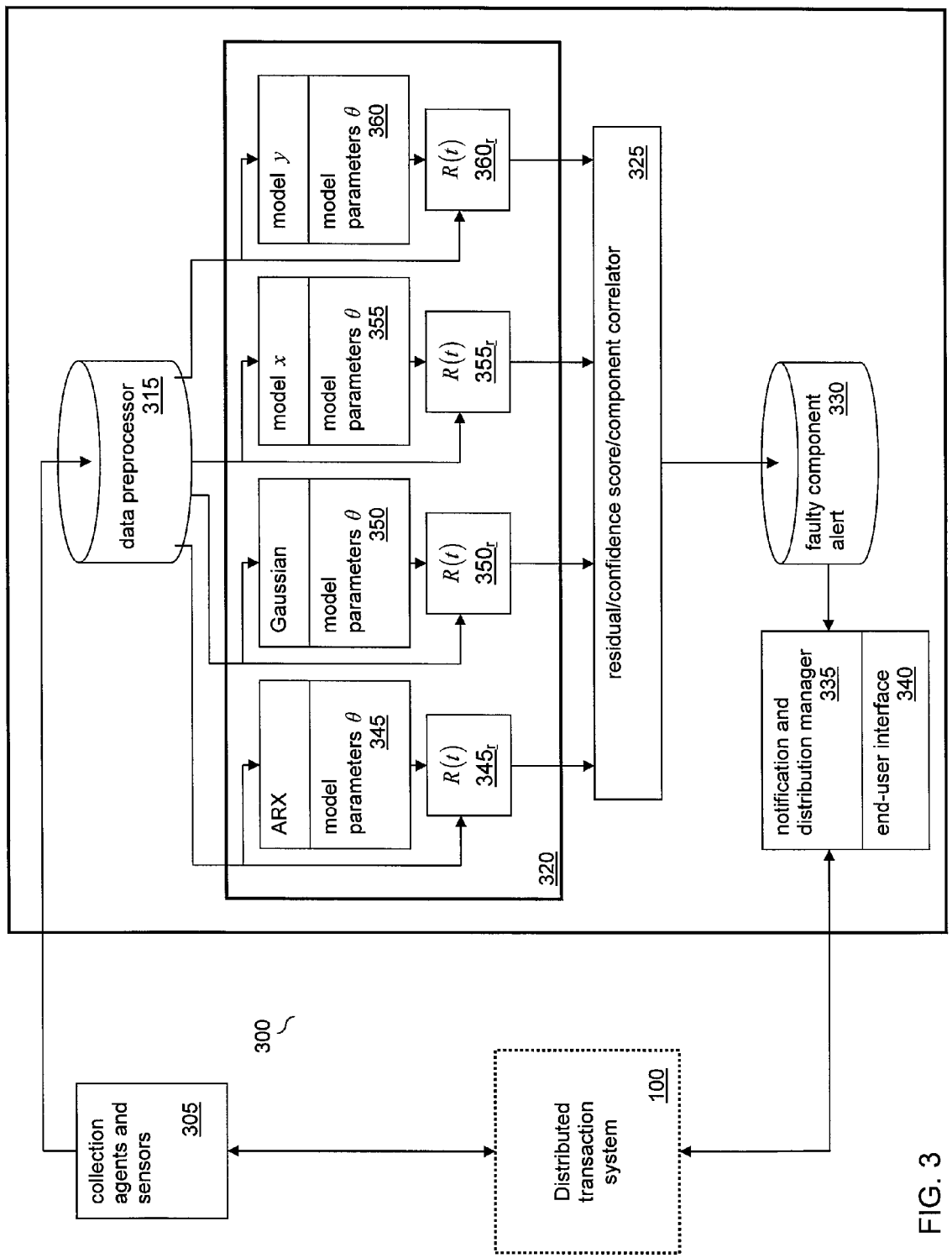
FIG. 3 is an exemplary framework of the individual modules of the invention.

Shown in FIG. 2 is the transaction fault detection and localization method 200 according to one embodiment of the invention. Shown in FIG. 3 is a corresponding framework 300 of the various modules that comprise the invention as executed in a data center server.

Since the invention is built using Web-based technology, and in one embodiment is an HTML based Web-enabled utility, an Internet browser using a communications network 125 can be used to access the invention application. Individual computers 105 at a plurality of locations can communicate with a server hosting the application. The server stores operational instructions for the application, data, preferred modes of contact for users, and other storage needs. System administrators and users having authorized access can access the invention through a browser or other client access application, or application specific interfaces.

Preferably, the invention framework 300 is secure and receives data from monitoring agents and sensors 305 in a distributed transaction system. The coupled modules include a data preprocessor/parser and store 315, a model library 320, a residual correlator 325, a component alert and store 330, a notification and distribution manager 335, and an end-user interface 340.

The invention employs agents 305 and accepts/imports flow intensity measurements from a plurality of monitoring tools in real time (step 205). The data preprocessor 315 accepts data from the monitoring agents 305 and/or monitoring data systems co-resident on the same server with the invention, or via the network 125. The monitoring data can be accepted from any agent, third party sensor, or system log file.

Flow intensity is the intensity with which internal monitoring systems react with the volume of user requests. For example, the monitoring agents 305 can monitor HTTP (Hypertext Transfer Protocol) request strings and SQL (Structured Query Language) queries over discrete sampling time periods such as every 10 seconds. Measurements other than HTTP requests and SQL queries can also be used.

Multiple flow intensity measurements can be acquired from one single monitoring point. For example, a Web server access log can be used to derive the flow intensity measurements of all HTTP requests made through that server as well as one specific HTTP request. A server access log records all transaction requests processed by its associated server. To effectively manage a Web server, it is necessary to receive feedback regarding its activity and performance as well as any problems that may be occurring.

An access log can determine the number of users, the number of transaction requests received and completed, the number of transactions performed on an information store or database, the number of sessions, and other access metrics. Based on data collected from lightweight monitoring mechanisms such as JMX (Java Management eXtensions); the number of live threads, the amount of heap memory usage, the number of in-use database connections, the number of processing EJBs (Enterprise JavaBeans), and others can be extracted by the preprocessor 315 and used to indicate flow intensity through an application server.

Counting the number of SQL queries using monitoring tools indicates database server flow intensity. SQL is a language that provides an interface to relational database systems. For servers, OS (Operating System) monitoring tools can be employed to collect data about CPU and memory usage. Other networking tools can collect statistical data about activity and traffic for the network.

Figure 4:
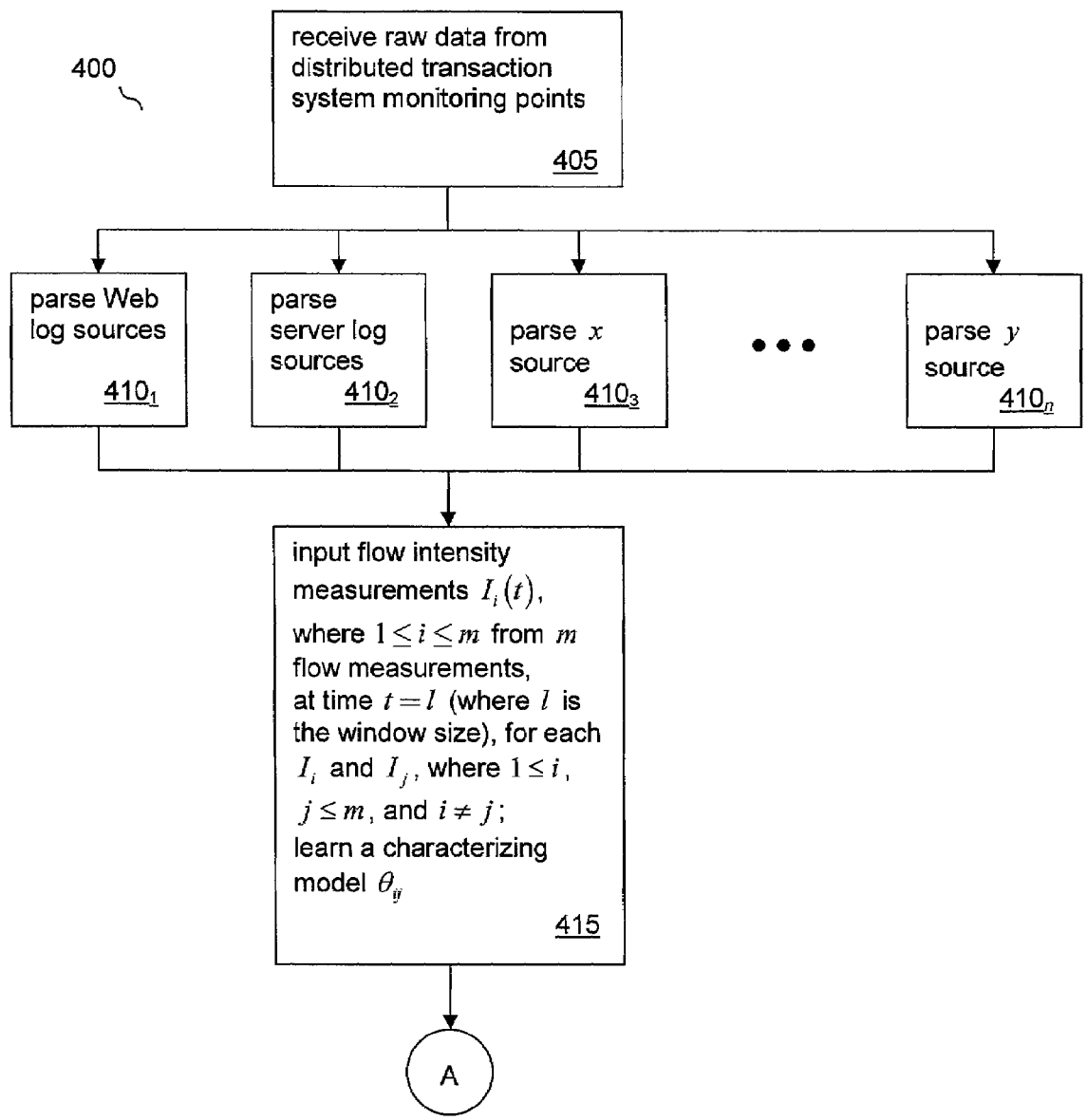
FIG. 4 is a block diagram of an exemplary preprocessing method.

The preprocessor 315 acts as a memory buffer, receiving (FIG. 4, step 400) incoming data from each predefined monitoring point. Raw data is received (step 405) by the preprocessor 315. Dedicated parsers (steps $410_1$, $410_2$, $410_3$, ..., $410_n$) for particular data source types parse the data from each monitoring point into normalized flow intensity measurements (such as in bytes) and in a compatible format for the framework 300 if required. The preprocessor 315 supports XML (eXtensible Markup Language) and other markup languages, and can normalize received data to an XML format or Java class.

The flow intensity data I(t) collected by the agents 305 and parsed by the preprocessor 315 is arranged and stored in a database. The preprocessor 315 knows, a priori, from which monitoring point received data originates from, $I_i(t)$, where $1 \leq i \leq m$ from m flow intensity measurements, and maps it to corresponding storage locations identified by source.

The preprocessor 315 arranges the flow intensity data in every combination of two monitoring points. For example, if 10 flow intensity monitoring points are employed (m=10), the number of combinations would be $$\frac{m(m-1)}{2},$$

or $$\frac{10(10-1)}{2} = 45.$$

The combinations of the source locations define segments between monitored points. The segments contain components C of the distributed system.

The relationship between every two flow intensity measurements is checked (step 415). As long as there is a relationship among two flow intensity measurements, a relationship is used to generate residuals which are used in fault detection and isolation.

Many faults could cause service failure or performance deterioration in a complex system. Faults include various software bugs, hardware problems and operator mistakes. Because of the diversity, it is impossible to use one general pattern to detect all faults. Various faults affect a system in different ways and have to be detected using different patterns. Assuming that n models are employed rather than one for fault detection, the invention can detect a wide class of faults by tracking the n residuals. The n models characterize the normal behavior of the monitored system from various perspectives.

Since it is not known whether a relationship exists between two measurements, a search is used. The invention discovers relationships by building model hypotheses first (step 210), and the uses sequential testing (step 215) to select good hypotheses (step 235) and eliminate bad hypotheses thereby validating the models in operation. Residuals (step 220) are what remains from observed data when a predicted amount is removed and are used in fault detection.

The invention receives user requests per unit time that flow through each monitoring point and builds a model for every two measurements. The model library 320 contains a plurality of learning models that are used to characterize relationships between the flow intensity measurements. The resultant models are continually tested with new data from each source location.

Figure 5A:
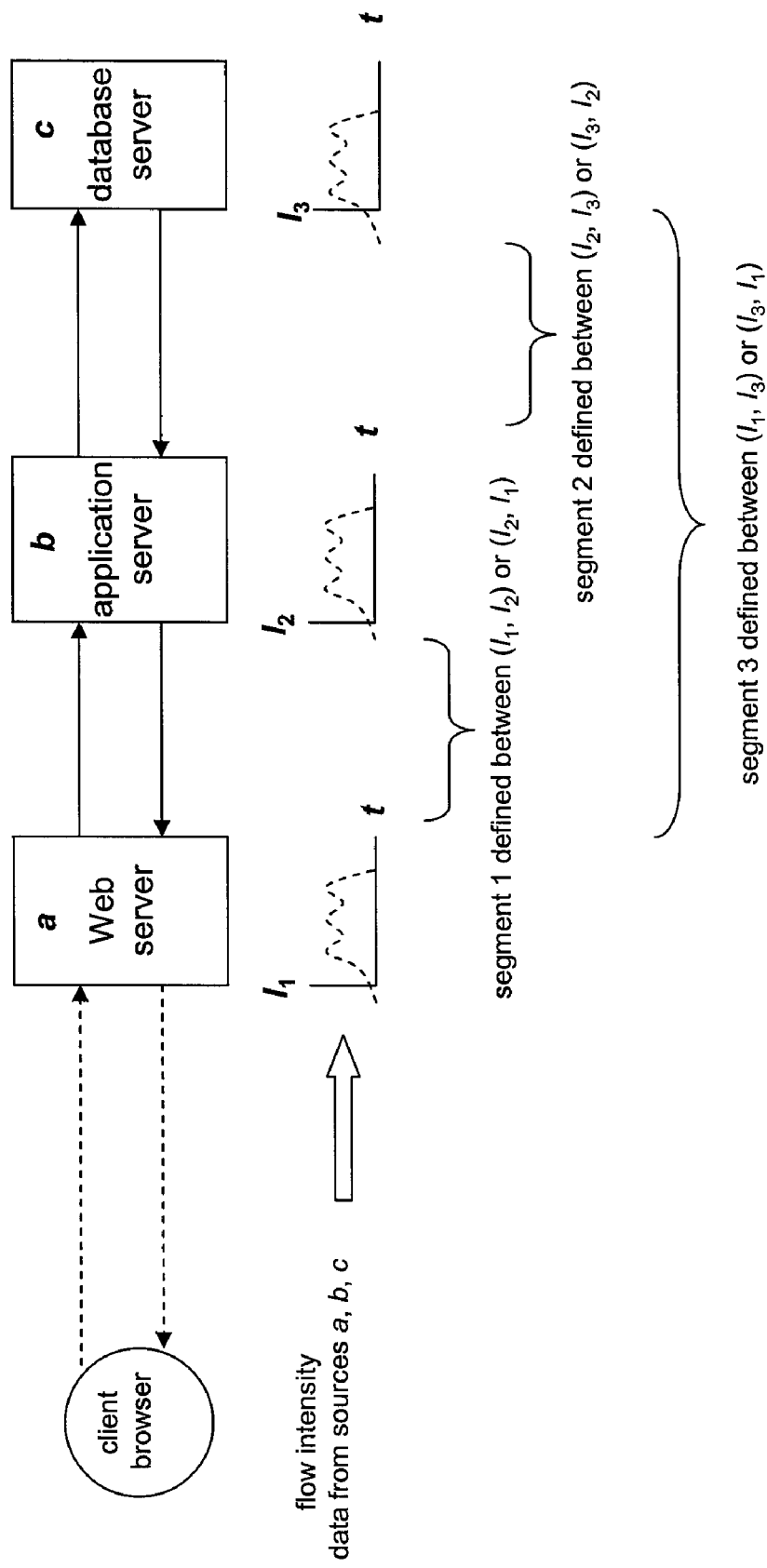
FIGS. 5a and 5b are exemplary flow intensity measurement and segment defining diagrams.

For example, shown in FIG. 5a are servers a, b and c providing three corresponding flow intensity measurements $I_1$, $I_2$ and $I_3$. After modeling and correlation, the invention can identify a faulty component C that is interposed between measurements. Only one relationship between flow intensity measurement points is used, either $(I_1, I_2)$ or $(I_2, I_1)$, based on which of the two models has a higher fitness score.

A segment located between two flow intensity measurement points is not defined as one component C. It may include many components. In FIG. 5a, if a server is considered as a component, then segment $(I_1, I_2)$ includes components a and b, segment $(I_2, I_3)$ includes components b and c, and segment $(I_1, I_3)$ includes components a, b, and c.

Figure 5B:
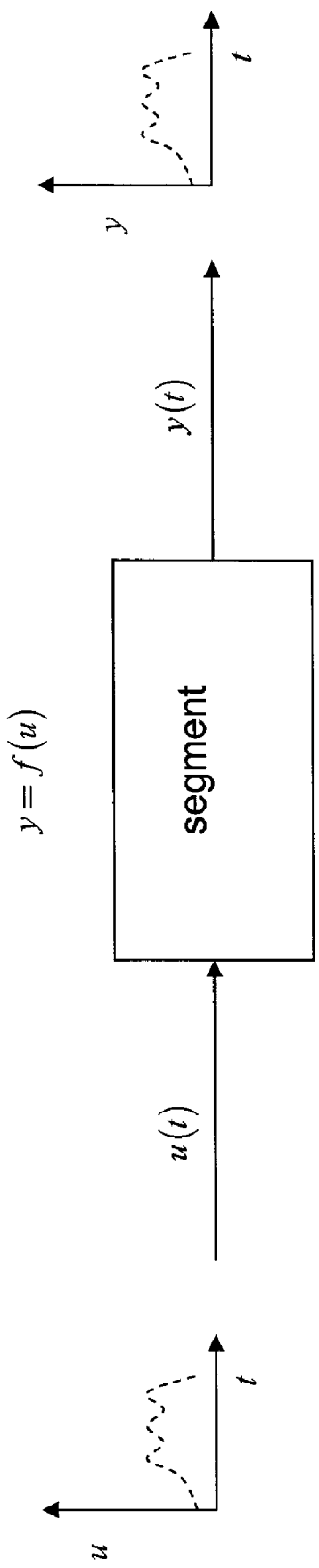

The invention views each distributed system segment as a black box as shown in FIG. 5b. Flow measured at an input and output reflects the flow dynamics of the segment. The dynamic relationship y=f(u) is determined by the internal constraint of the segment, where input u and output y are both a time series (t) of flow intensity measurements. If the appearance of a fault changes the constraint f, flow is likely to be affected and the dynamic relationship y=f(u) could be violated. A fault can be detected by tracking whether the relationship y=f(u) holds over time.

The correlation between the monitoring data measured at an input and at an output of a segment can reflect the constraints that the monitored system bears. As an engineered system, the constraints can be imposed by many factors such as hardware capacity, application software logic and system architecture. After a fault occurs inside a component C, some of the constraints may be violated. Continuously tracking the correlation between input and output measurements can detect component faults (steps 225, 230).

The model library 320 comprises linear regression 345, Gaussian distribution 350, and other models 355, 360 to learn relationships between flow intensity measurements. Preferably, the invention uses the linear regression 345 and Gaussian distribution 350 learning models. Due to distributed transaction system dynamics and uncertainties, some correlations may only be characterized using probabilistic models such as Gaussian mixture models.

Figure 6A:
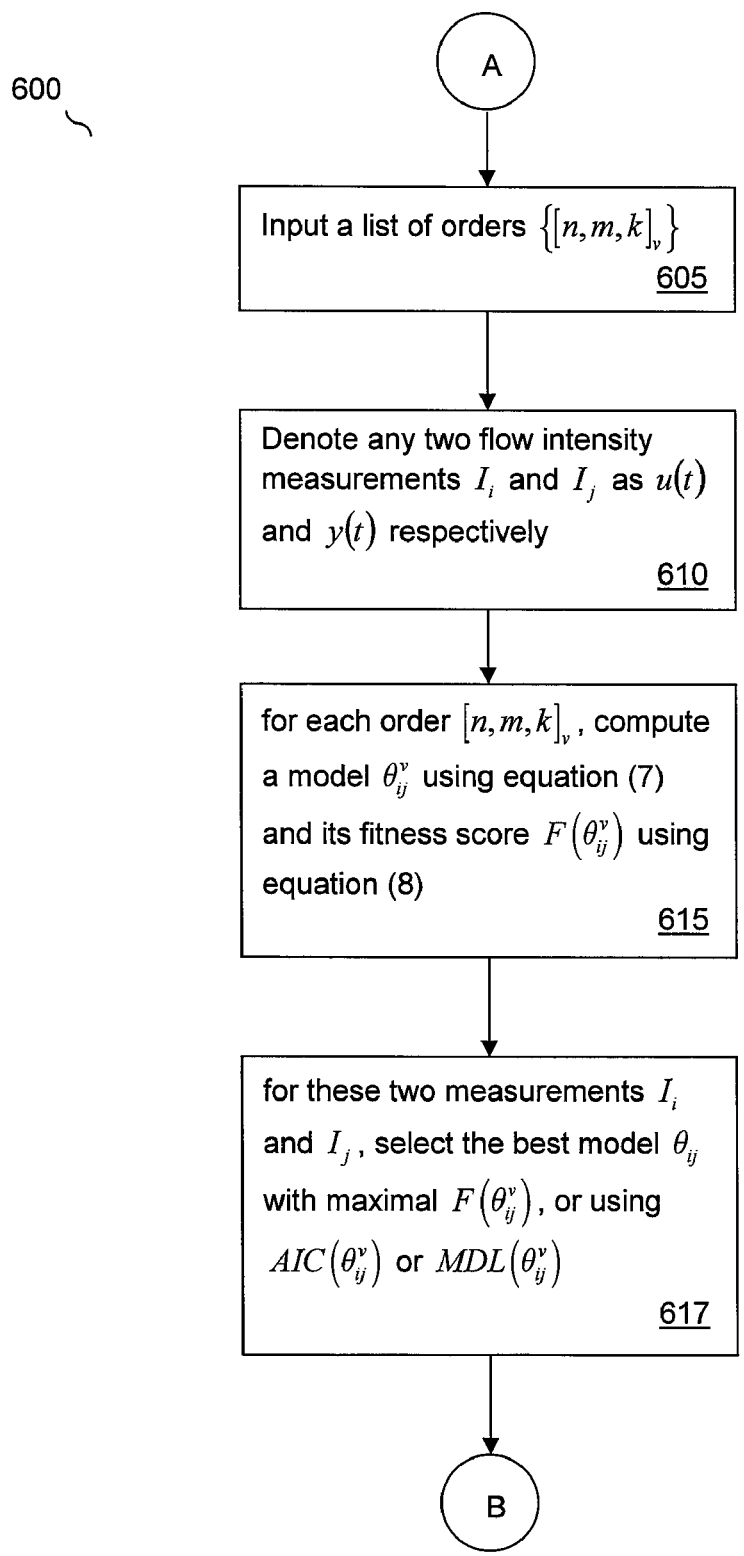
FIGS. 6a, 6b and 6c is a block diagram of an exemplary linear regression learning model method according to the invention.

Autoregressive Learning Model (FIGS. 6a, b, c)

The autoregressive learning model 345 is one of a group of linear prediction formulas that attempts to predict an output, y[n], of a system based on the previous outputs y(n–1), y(n–2) ... and inputs u(n), u(n–1), u(n–2) .... Autoregressive models comprise an autoregressive (AR) model that depends only on the previous outputs of the system, a moving average model (MA) that depends only on the inputs to the system and an autoregressive-moving-average model (ARMA) that is based on both inputs and outputs. Other linear or nonlinear data relationship models can also be used in the invention framework 300. The autoregressive learning model method 600 is shown in FIG. 6a.

The flow intensity measured at a component input is denoted as u(t) and at an output as y(t) at time t (step 610). The ARX model describes input and output relationships as $$y(t)+a_1 y(t-1)+\ldots+a_n y(t-n)=b_0 u(t-k)+\ldots+b_m u(t-k-m), \quad (1)$$

where [n, m, k] is the order of the model and $a_1, a_2, \ldots, a_n$ and $b_0, b_1, \ldots, b_m$ are coefficients that must be determined prior to deriving the linear prediction model (step 605). The order parameter [n, m, k] determines how many previous steps are affecting the current outputs.

The coefficient parameters $a_i$ and $b_i$ reflect how strongly a previous step is affecting the output.

$$\theta = [a_1, \ldots, a_n, b_0, \ldots, b_m]^T, \text{ and} \quad (2)$$

$$\varphi(t) = [-y(t-1), \ldots, -y(t-n), u(t-k), \ldots, u(t-k-m)]^T \quad (3)$$

where $\theta$ is the coefficient parameter and $\varphi(t)$ is the previous inputs and outputs needed to compute the current output. T is the transpose of a matrix. Equation (1) can be rewritten after substitution as $$y(t) = \varphi(t)^T \theta. \quad (4)$$

Assuming that the flow intensity inputs and outputs are observed at discrete times over a time interval $1 \leq t \leq N$, the observation, $O_N$, over a sequence of real observations is $$O_N = \{u(1), y(1), \ldots, u(N), y(N)\}. \quad (5)$$

For a given model $\theta$, the observed inputs u(t) are used to calculate simulated outputs $\hat{y}(t|\theta)$ with t given $\theta$ according to equation (1). The circumflex $\hat{y}$ indicates that $\hat{y}(t|\theta)$ are the predictions from the model. The simulated outputs $\hat{y}(t|\theta)$ can be compared with the real observed outputs y(t), defining an estimation error as $$E_N(\theta, O_N) = \frac{1}{N} \sum_{t=1}^{N} (y(t) - \hat{y}(t \mid \theta))^2, \quad (6)$$

$$= \frac{1}{N} \sum_{t=1}^{N} (y(t) - \varphi(t)^T \theta)^2.$$

The Least Squares Method (LSM) can be used to find the $\hat{\theta}$ that minimizes the estimation error $E_N(\theta, O_N)$ $$\hat{\theta}_N = \left[ \sum_{t=1}^{N} \varphi(t) \varphi(t)^T \right]^{-1} \sum_{t=1}^{N} \varphi(t) y(t). \quad (7)$$

The ARX model can model a characterizing relationship between an input and output, i.e., multiple flow intensity measurements as the inputs and/or outputs in equation (1).

Each flow intensity pair is modeled over a time series. Then, each model undergoes testing using specific criteria to evaluate how well a learned model fits its corresponding real observation. The relationship $F(\theta)$ calculates a normalized fitness score for model validation (step 615)

$$F(\theta) = \left[ 1 - \frac{\sum_{t=1}^{N} |y(t) - \hat{y}(t \mid \theta)|^2}{\sum_{t=1}^{N} |y(t) - \bar{y}|^2} \right] \cdot 100, \quad (8)$$

where $\bar{y}$ is the mean of the real output y(t) over the series N.

The larger the fitness score $F(\theta)$, the better the model fits the observed data. As the order of the model structure [n, m] increases, the fitness score $F(\theta)$ monotonically decreases and models that over-fit the data can be learned. The increasing flexibility of the model structure eventually enables the model to fit noise well (i.e. over-fit). However, noise changes randomly with time and does not reflect flow dynamics.

Therefore, criteria such as Akaike's Information-theoretic Criterion (AIC) and Rissanen's Minimum Description Length (MDL) can also be used to indicate the quality of the model (step 617).

A range can be set for the order [n, m, k] instead of a fixed number to learn a list of model candidates, with a model selected from the list based on these criteria. The linear regression model captures the relationship between measurements of flow in real systems.

Figure 6B:
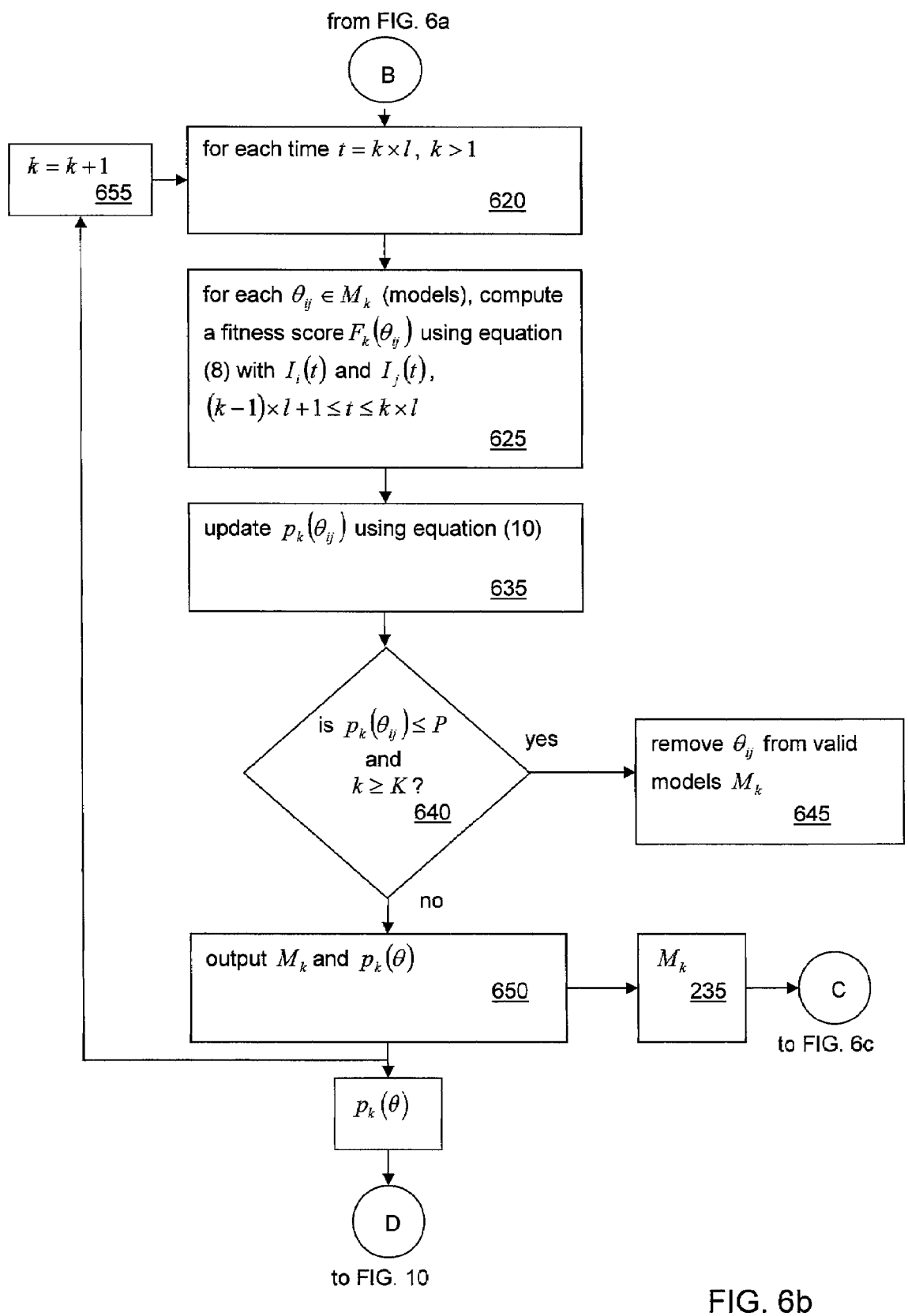

Autoregressive Learning Model Validation (FIG. 6*b*)

The fitness score $F_i(\theta_{ij}^{\,v})$ is used to evaluate how well the learned ARX models match the observed data during an $i^{th}$ time window for a specific model order $[n, m, k]_v$. v represents an order sequence. For example, if $0 \leq [n, m, k] \leq 2$, then v=0, 1, 2, ... with n, m and k combinations such as [0,0,0], [0,1,0], ..., [2,2,2]. One v is chosen that best represents the data.

A fitness score threshold $\tilde{F}$ is determined. The fitness threshold $\tilde{F}$ can have a value between an upper bound of 100 and a lower bound in negative numbers. The higher the fitness score $F_i(\theta_{ij}^{\,v})$, the better a learned model is. A threshold value $\tilde{F}$ such as 50 can be used to select good models, and can be adjusted accordingly. The following function is used to determine whether the model fits the data or not.

$$f(F_i(\theta)) = \begin{cases} 1 & \text{if } F_i(\theta) > \tilde{F} \\ 0 & \text{if } F_i(\theta) \leq \tilde{F}. \end{cases} \quad (9)$$

The length of a time window is l, i.e., including l data observations (sampling time units) from each measurement, k windows means that the invention receives (k)(l) data observations from each measurement. Each measurement from a monitoring point is an endless time series.

After receiving monitoring data for k windows (total k×l time units) (FIG. 6*b*, step 620), a confidence score $p_k(\theta)$ representing how robust a model is can be computed. The confidence score $p_k(\theta)$ is defined as $$p_k(\theta) = \frac{\sum_{i=1}^{k} f(F_i(\theta))}{k}, \quad (10)$$

$$= \frac{p_{k-1}(\theta) \cdot (k-1) + f(F_i(\theta))}{k}.$$

As can be seen in the second line of equation (10), the value of $p_k(\theta)$ will be minimally affected by the current fitness score $F_k(\theta)$ (step 625) after k becomes large. The most recent observations, L windows, (i.e. from k−L to k) instead of the total k windows is used to compute the current $p_k(\theta)$ (step 635).

The valid set of models at time t=k×l is denoted by $M_k$, i.e., $M_k = \{\theta | p_k(\theta) > P\}$. P is the confidence threshold chosen to determine whether a model is valid.

The invention learns a model for any two flow measurements, and then incrementally validates each model with new flow intensity measurements. After a time period, K×l sampling time units, where K is a predetermined number, if the confidence score $p_k(\theta)$ of a model is less than the selected confidence threshold P (step 640), the model is invalid and the validation of the model stops (step 645).

Since the occurrence of faults may deteriorate the confidence score $p_k(\theta)$ temporally, a number of time windows K are required to ensure that the model is invalid. In an operational environment like Internet services, normal situation dominate and faulty situations are rare. For these situations, a validation determination can be made using a small value for K. During sequential testing with new observation data, if a confidence score $p_k(\theta)$ for a model is less than or equal to P, testing of the model is stopped and the model is removed from the valid set of models $M_k$ (step 235).

The method 600 continues to validate the models left after the previous selection process and keeps updating the confidence score $p_k(\theta)$ to keep tracking the quality of the valid models (steps 655, 620, 625, 635, 640). If the confidence score $p_k(\theta)$ keeps deteriorating because of some uncertainties and changes (not caused by faults) in the system, the model can be relearned.

Additionally, the updated confidence score $p_k(\theta)$ is used to evaluate residuals generated from the model (step 650). Assuming that a residual threshold is correctly selected, a high $p_k(\theta)$ value yields more confidence about the detection result generated from the model. Conversely, if the confidence score $p_k(\theta)$ of a model is relatively low, the modeled relationship may not be robust and the correctness of its residual in detection may be in doubt. In order to keep the confidence score $p_k(\theta)$ up-to-date, the latest L windows (instead of the total k windows) are used to compute $p_k(\theta)$.

If the length of a time window 1 is short, the method uses data from multiple windows as the training data to learn models. A large amount of data is used for training because the monitoring data from operational environments is sufficient. As long as the normal behavior is dominant in the collected training data, the method of the invention is effective even if the training data includes faulty situations. This condition can be satisfied by using a large amount of training data, because faulty situations usually only occupy less than 1% of operational time for most Internet services.

The invention models the dominant relationship between measurements with little attention to the rare outliers in the training data. The method learns the model by minimizing the estimation error $E_N(\theta, O_N)$. According to equation (6), with a large N, several peaks of the error $(y(t)-\hat{y}(t|\theta))^2$ caused by faults will change the total estimation error value $E_N(\theta, O_N)$ little. Large amounts of training data are necessary for a model to capture various flow dynamics that could happen in the monitored system.

The confidence score $p_k(\theta)$ can also indicate how much the model has changed and needs to be relearned. As described above, the method keeps updating the confidence score $p_k(\theta)$ for each valid model $\theta$.

Figure 6C:
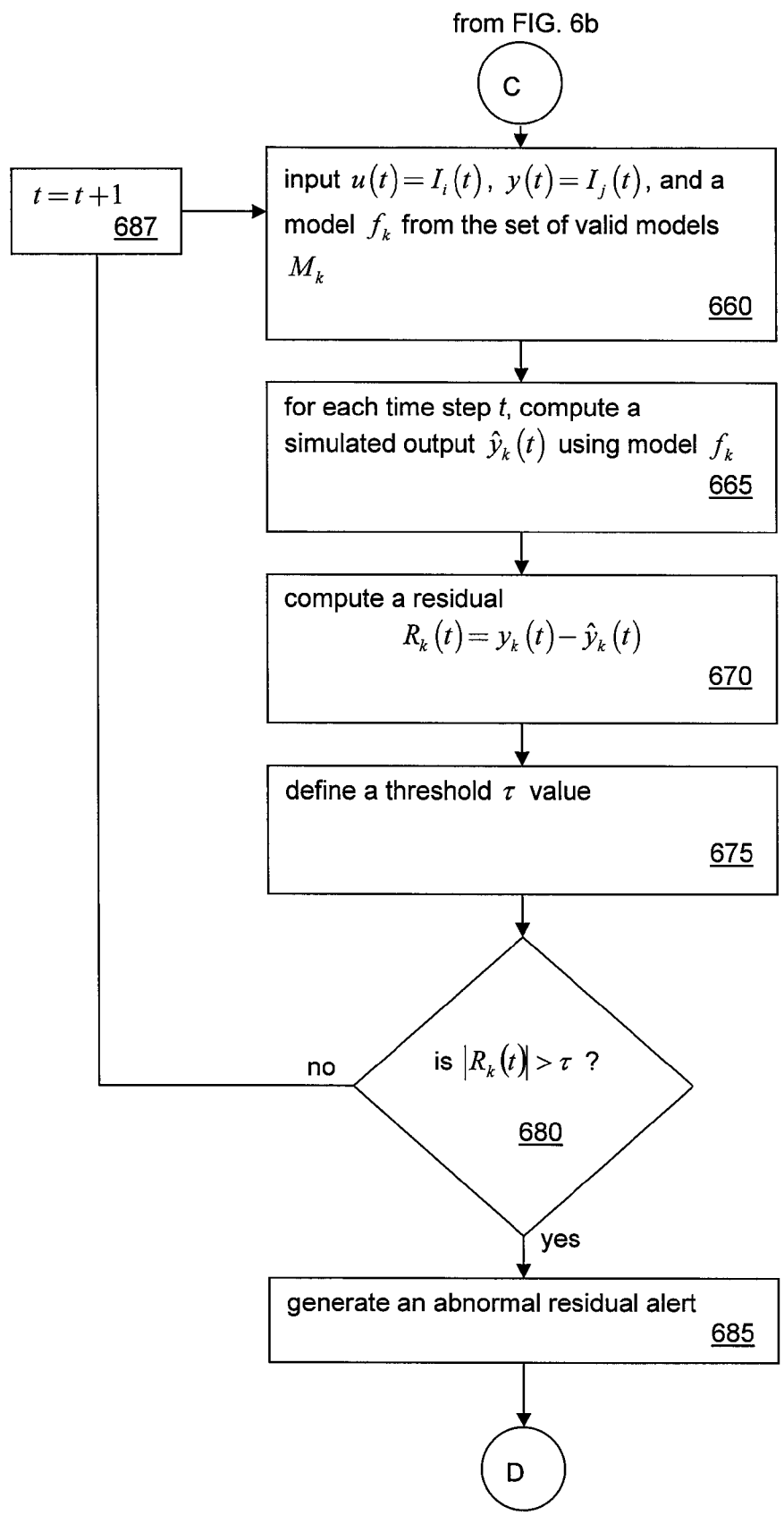

Autoregressive Learning Model Residual Generation (FIG. 6c)

Residuals are the difference between observed and predicted values. Residuals are generated 345$_r$, 350$_r$, 355$_r$, 360$_r$ for each learned model and are used to detect failures in the model assumptions since they correspond to errors in the model. The residuals are correlated and have variances that depend on how well the learned model characterizes the relationship between flow intensity measurements. The invention monitors the modeled relationships for fault detection and isolation—not the the input/output values which continually change due to varying user loads.

A model will be learned for each pair of flow intensity measurement points (FIG. 6c, step 660). For example, model k is the learned model that describes the flow dynamics in the $k^{th}$ segment. $x_k$ and $y_k$ are the flow intensities measured at the input and output of the $k^{th}$ segment. $\hat{y}_k$ is the simulated output of the model k when fed with the real measurements $x_k$ and $y_k$, $$\hat{y}_k = f_k(x_k, y_k), \tag{11}$$

where $f_k$ represents the model for the $k^{th}$ segment (step 665).

The real outputs $y_k$ observed at earlier time steps are needed to compute the current simulated output $\hat{y}_k$. Continuing with the example, inputs u(t) and u(t−1), etc., are needed to compute the current output $\hat{y}(t)$. Instead of using the simulated outputs such as $\hat{y}(t-1)$ and $\hat{y}(t-2)$, the real output observed at the earlier times must be used to compute the current simulated output. Otherwise, the estimation error will be accumulated with time.

A $k^{th}$ residual is generated using $$R_k(t) = y_k(t) - \hat{y}_k(t). \tag{12}$$

If n relationships are extracted among flow intensity measurements, n residuals will be generated (step 670). n represents the number of models that resulted from modeling and validation. In a normal situation without faults, the residuals can be regarded as noise resulting from modeling. If a fault occurs inside the system, some of the n relationships could be affected and their residuals become significantly larger. Fault detection and localization is achieved by tracking the residuals.

A threshold is needed to determine the abnormality of a residual. The threshold can only be optimized if the distribution of residuals resulted from various faults are known. Since the residuals are tracked over time (step 687), the statistics of the past observed residuals are used to derive a dynamic threshold (step 675).

For example, a threshold $\tau$ $$\tau = 1.1 \arg_R \{ \text{prob}(|R(t)| < \hat{R}) = 0.995 \}, \tag{13}$$

may be selected where a value $\hat{R}$ is chosen that is larger than 99.5% of the observed residuals (after a long observation time period t) and the threshold is 1.1 times $\hat{R}$. Since faulty situations are very rare in operations and normal situations are dominant, most of the observed residuals are normal noise. The concern is with residuals that are larger than the threshold $\tau$ (steps 680, 685).

Figure 7A:
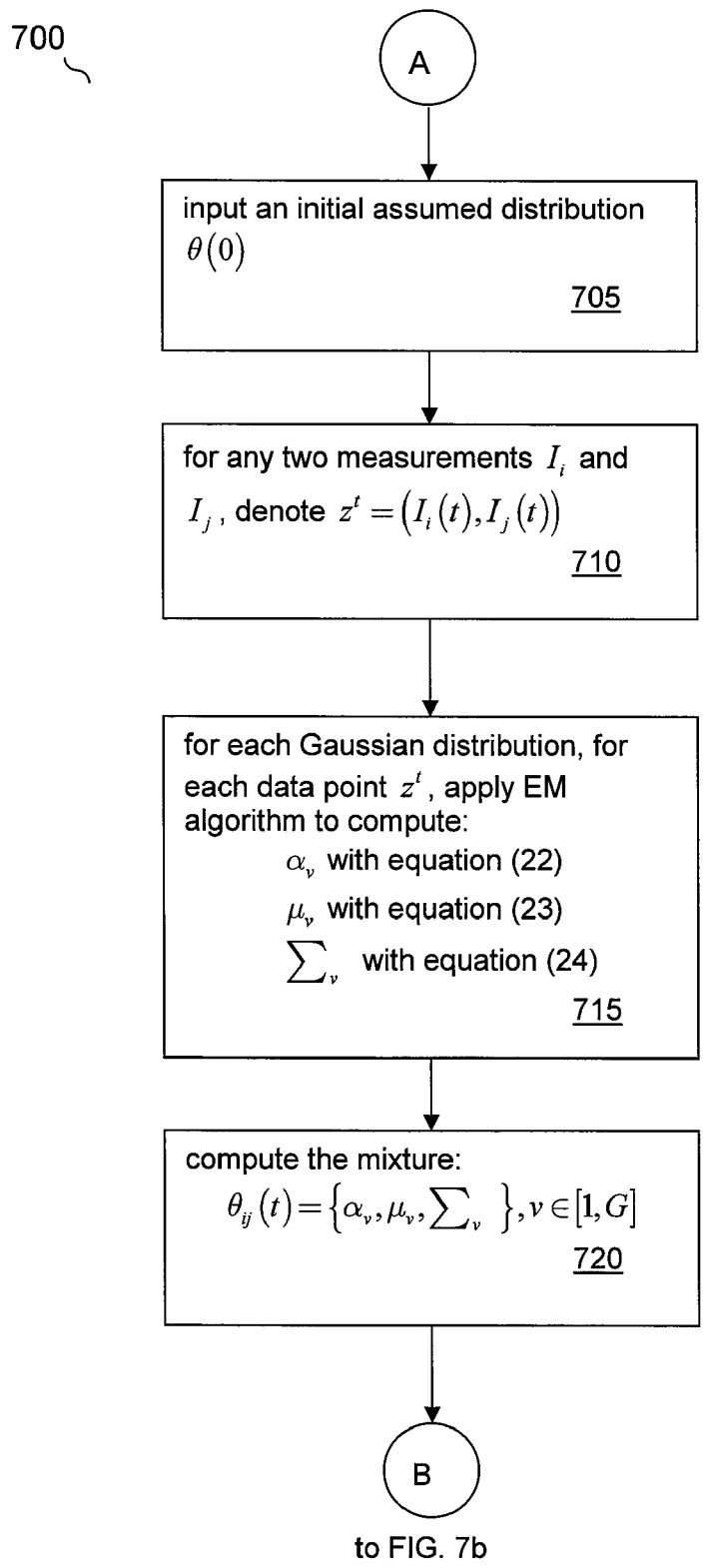
FIGS. 7a, 7b and 7c is a block diagram of an exemplary Gaussian learning model method according to the invention.

Gaussian Learning Model (FIGS. 7a, b, c)

Due to system dynamics and uncertainties, some flow intensity measurements may not have linear relationships as described in the ARX model. For such flow intensity measurements, probabilistic models are used to characterize their relationships.

The invention employs a finite Gaussian mixture model 350 to describe the probability distribution of flow intensity measurements calculated from the monitoring data. An online recursive Expectation Approximation (EM) algorithm is used to learn the parameters of Gaussian mixtures and estimate a boundary of normal data distribution while adapting to system and load changes. The boundary is used to distinguish outliers from normal data points. Outliers have low probability density.

The invention automatically searches and validates relationships among the monitoring data. Similar to the autoregressive model 345, a procedure is used to automatically search and validate probabilistic relationships between each pair of flow intensity measurements. All combinations of two flow intensity measurements are used to first derive a mixture model in a brute force way, and afterwards, sequentially testing is conducted to validate the model with new incoming data points.

The Gaussian mixture model 350 approximates the probabilistic correlation between flow intensity measurements. The Gaussian mixture learning model method 700 is shown in FIG. 7a. The method automatically builds a probabilistic relationship between two measurements based on Gaussian mixture models. A probability density boundary is derived by tracking the mass characteristics of historical flow intensity measurements.

Figure 8:
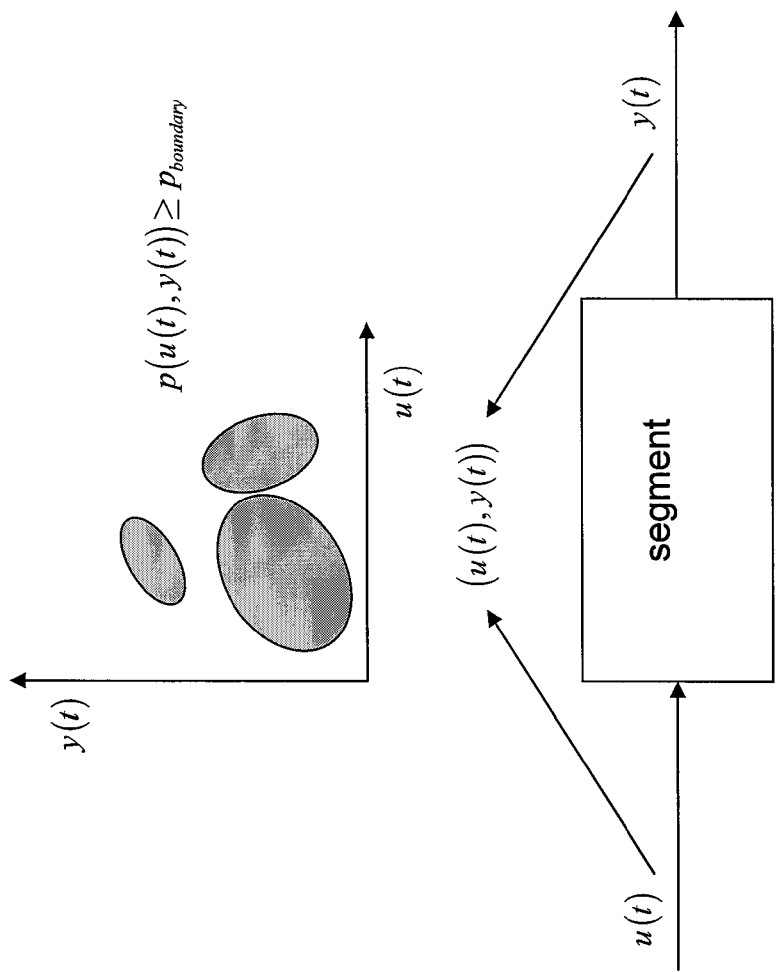
FIG. 8 is an exemplary flow intensity measurement and segment defining diagram for probability models.

Each pair of flow intensity measurements from the preprocessor 315, u(t) and y(t), form a set of two-dimensional variables z(t)=(u(t), y(t)) which correspond to data points in a 2-D space as shown in FIG. 8.

If a boundary $p_{boundary}$ is chosen to have 99% probability coverage, the probability density of a data point inside the boundary is always greater than that outside the boundary. Anomalies are detected by determining if a current flow intensity measurement is located outside of a correlation boundary, i.e., determining whether the probability density p(u(t), y(t)) is less than $p_{boundary}$.

Many flow intensity measurements follow a Gaussian distribution. As discussed above, the volume of user requests is the factor that affects the intensity of internal monitoring data. Flow intensity measurements respond to the current level of user loads, but are also affected by uncertainties. Given a volume of user requests, these measurements can follow a Gaussian distribution, and their mean values can correspond to the current user loads. Since user loads change, a plurality of Gaussian distributions can capture the mass characteristics of the flow intensity measurements.

For a Gaussian mixture model (step 705), the following probability density function p is used to approximate the real data distribution $$p(z_i \mid \theta) = \sum_{j=1}^{G} \alpha_j p_j\left(z_i \mid \mu_j, \sum_j\right). \quad (14)$$

The correlations between each pair, z(t)=(u(t), y(t)), of flow intensity measurements are considered (step 710). Data points, $z_i$, are 2-D vectors denoted by $\{z_i\}=\{(u_i, y_i)\}$ with $1 \leq i \leq N$, where N is the number of data samples. Data samples represent data points in a time series and do not relate to the number of flow intensity measurements. For example, if there are 10 flow intensity measurements, each measurement includes N data sample points. Each flow intensity measurement is a time series. G is the number of mixtures automatically determined during the learning process. Equation (14) shows a mixture of G Gaussian distributions. $\alpha_1, \ldots, \alpha_G$ are the weights of these mixtures with $$\sum_{j=1}^{G} \alpha_j = 1.$$

$$p_j\left(z_i \mid \mu_j, \sum_j\right)$$

denotes a $j^{th}$ two-dimensional Gaussian distribution with its mean value $\mu_j$ and covariance matrix $\Sigma_j$, $$p_j(z \mid \theta_j) = \frac{1}{2\pi |\Sigma_j|^{\frac{1}{2}}} \exp\left\{-\frac{1}{2}(z-\mu_j)' \sum_j^{-1} (z-\mu_j)\right\}. \quad (15)$$

The mixture parameter set is $$\theta = \{(\alpha_i, \mu_i, \Sigma_i), 1 \leq i \leq G\}. \quad (16)$$

As shown in equation (14), the probability density of a data point is a weighted mixture of the G Gaussian distributions. Given data samples, the EM algorithm can be used to estimate the optimal parameter set $\hat{\theta}$ that maximally approximates the real data distribution. The mixture probability density defined in equation (14) is the sum of each Gaussian distribution's probability density multiplied with its mixture weight (equation (15) is one Gaussian distribution).

EM is used to maximize the posteriori estimates of mixture parameters. Due to system dynamics and uncertainties, a recursive EM algorithm is used to update models dynamically in operational environments. A new data point is regarded as an outlier if it is located outside of the selected boundary.

The Gaussian model learning method 700 includes recursive EM as well as a method for outlier detection. Recursive EM is an online discounting variant of the EM algorithm. A stochastic discounting approximation procedure is conducted to estimate the parameters recursively. In real time applications, recursive EM is better than classic EM in that the parameters are updated online with a "forgetting factor" degrading the influence of out-of-date samples. Recursive EM is capable of adapting to system dynamics in real time.

EM comprises two steps: an E-step where a soft assignment is computed that assigns a posterior probability to each possible association of each individual sample, and an M-step where a lower bound is maximized and corresponding new estimates are guaranteed to lie closer to the location of the nearest local maximum of the likelihood. Each iteration round is an increasingly better approximation to the mode of the likelihood, until at convergence.

$$E\text{-Step: } Q(\theta, \hat{\theta}_{k-1}) = E_l(\log p(Z, l \mid \theta) \mid Z, \hat{\theta}_{k-1}), \text{ and} \quad (17)$$

$$M\text{-Step:} \quad (18)$$

$$\hat{\theta}_k = \underset{\theta}{\operatorname{argmax}}(Q(\theta, \hat{\theta}_{k-1})),$$

where Z is the set of data samples, and $l=\{1^{(1)}, 1^{(2)}, \ldots, 1^{(G)}\}$ is a binary vector of G labels indicating which cluster a data sample belongs to. For a mixture of G models, there are G clusters. For example, if $1^{(1)}=1, 1^{(2)}=\ldots, 1^{(G)}=0$, it indicates that this sample belongs to cluster 1. For Gaussian mixture models, EM is based on the observations Z as incomplete data and the missing part is the information of labels. The complete log likelihood is log p(Z, l|θ), from which θ may be estimated if the complete data {Z, l} is given.

Rather than maximize $Q(\theta, \hat{\theta}_{k-1})$ in standard EM, the invention maximizes the following optimization criteria J in recursive EM $$J = Q(\theta, \hat{\theta}_{k-1})V(\alpha), \quad (19)$$
$$= E_l(\log p(Z, l|\theta)|Z, \hat{\theta}_{k-1}) + \log \prod_{j=1}^{G} \alpha_j^{c_j},$$
$$\hat{\theta} = \arg\max_{\theta} J,$$

where $V(\alpha)$ is introduced as a penalty function to remove unnecessary clusters in the mixtures.

$$V(\alpha) \propto -\sum_{j=1}^{G} c_j \log \alpha_j = -\log \prod_{j=1}^{G} \alpha_j^{c_j}$$

is the negative logarithm of a Dirichlet prior where $$\alpha = \{\alpha_1, \ldots, \alpha_G\}, \sum_{j=1}^{G} \alpha_j = 1.$$

The penalty function $V(\alpha)$ always decreases with fewer clusters.

$$c_j = -\frac{D}{2}$$

where D represents the number of parameters per cluster. For the Maximum A Posteriori (MAP) solution, using Lagrangian optimization $$\frac{\partial}{\partial \alpha_j}\left(E_l(\log p(Z, l|\theta)|Z, \partial k - 1) + \log \prod_{j=1}^{G} \alpha_j^{c_j} + \lambda\left(\sum_{j=1}^{G} \alpha_j - 1\right)\right) = 0, \quad (20)$$

where $\lambda$ is the Lagrange multiplier. Based on equation (20), the following recursive equations are obtained $$o_j^t(z^{t+1}) = \frac{\alpha_j^t p_j(z^{t+1}|\hat{\theta}_j^t)}{p(z^{t+1}|\hat{\theta}^t)}, \quad (21)$$

$$\alpha_j^{t+1} = \alpha_j^t + \rho\left(\frac{o_j^t(z^{t+1})}{1 - Gc_T} - \alpha_j^t\right) - \rho\frac{c_T}{1 - Gc_T}, \quad (22)$$
$$= \rho\left(\frac{o_j^t(z^{t+1}) - c_T}{1 - Gc_T}\right) + (1 - \rho)\alpha_j^t,$$

where $$c_T = \frac{D}{(2T)}$$

and T is a constant integer which should be large enough to ensure that $Gc_T < 1$. $z^{t+1}$ is the new data point collected at sampling time $$t + 1. \ \rho = \frac{1}{T}$$

is a fixed forgetting factor used to reduce the influence of out-of-date samples.

After the new weights of mixtures $\alpha_j^{t+1}$ are calculated, the method checks whether there are unnecessary clusters (Gaussian distributions) in the mixtures or nof and removes those clusters with $\alpha_j^{t+1} < 0$. As discussed above, this mechanism of discarding unnecessary clusters is achieved by introducing the penalty function. The rest of the parameters can be updated with the following equations $$\mu_j^{t+1} = \mu_j^t + w\delta, \text{ and} \quad (23)$$

$$\sum_{j}^{t+1} = \sum_{j}^{t} + w\left(\delta\delta^T - \sum_{j}^{t}\right), \quad (24)$$

where $$w = \rho \frac{o_j^t(z^{t+1})}{\alpha_i^t}$$

and $\delta = (z^{t+1} - \mu_j^t)$.

For each iteration of each data point $z^t$, these parameters are updated with a new received data point (steps 715, 720).

For each Gaussian distribution $j\in[1, G]$, the probability density of data points on its boundary is $p(b_j^t|\theta_j)$ where $b_j^t$ represents any data point on the boundary of the $j^{th}$ Gaussian distribution at time t. $b_j^t$ does not have to be the data point observed from real systems. Instead, it is a data point in the learned continuous Gaussian distribution model according to the invention.

Figure 7B:
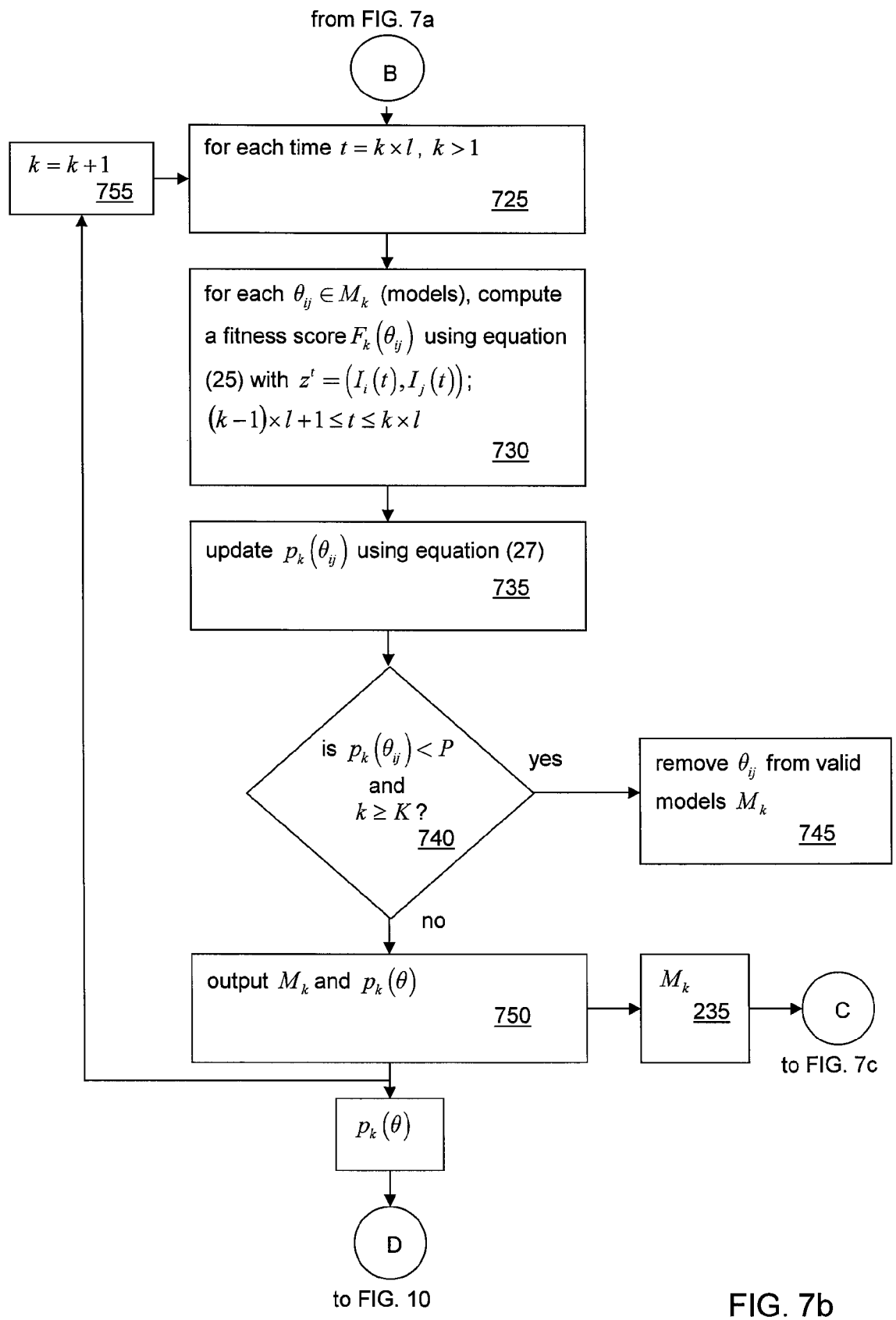

Gaussian Learning Model Validation (FIG. 7*b*)

For distributed transaction systems, many pairs of flow intensity measurements can be collected. However, a determination must be made whether the real data distribution fits the Gaussian distribution or not. The correlation between some flow intensity measurements may not be well characterized with Gaussian mixture models if their real data distribution does not follow Gaussian distribution. The invention automatically validates whether a real data distribution can be modeled with Gaussian mixture models.

The invention uses a normalized difference between the estimated and empirical data distribution to measure how well the learned Gaussian model fits the real data distribution. Each cluster (Gaussian distribution) is divided into several segments having equal area. For each segment, the invention calculates the estimated probability based on the learned Gaussian model as well as the empirical probability based on the real data distribution.

Given a probability coverage, a two-dimensional Gaussian distribution determines a corresponding ellipse in the original 2-D data space. S represents the area of the ellipse with 99% probability coverage. Sharing the same center with that ellipse, M−1 smaller ellipses are derived having an area size equal to $$\frac{S}{M}, \ldots, \frac{kS}{M}, \ldots, \frac{(M-1)S}{M}$$

respectively. M is selected manually, such as M=10.

Cluster segments refer to the M−1 elliptic rings and the smallest ellipse located in the center of the ellipse S. The estimated probability of a segment k, $\hat{p}_{est}(k)$, is defined to be the probability of segment k using the estimated Gaussian mixture model while the empirical probability of segment k, $p_{real}(k)$, is the ratio between the number of data points in segment k and the total number of data points N. N represents the total number of data points, more than contained in ellipse S.

The following calculates a normalized fitness score $F(\theta)$ for evaluating the learned model (steps 725, 730)

$$F(\theta) = \left[1 - \frac{\sum_{k=1}^{M}(p_{real}(k) - \hat{p}_{est}(k))^2}{\sum_{k=1}^{M}\left(p_{real}(k) - \frac{1}{M}\right)^2}\right] \times 100 \quad (25)$$

where $p_{real}(k)$ and $\hat{p}_{est}(k)$, respectively, represents the empirical probability and estimated probability of data points in a $k^{th}$ segment.

$$\frac{1}{M}$$

is the mean of probabilities in all segments, i.e., the probability of uniform distribution.

A high fitness score $F(\theta)$ indicates that the real data distribution is well characterized by the estimated Gaussian mixture model. The upper bound of the fitness score in equation (25) is 100.

$F_v(\theta)$ is used to denote the fitness score that is calculated with data points collected during a $v^{th}$ time window. Each measurement is a time series which includes many data points. A threshold $\hat{F}$ is chosen to determine whether the model fits the real data distribution or not in the following piecewise function $$f(F_v(\theta)) = \begin{cases} 1 & \text{if } F_v(\theta) > \hat{F} \\ 0 & \text{if } F_v(\theta) < \hat{F} \end{cases} \quad (26)$$

After receiving monitoring data for k time windows (with a fixed window size), a confidence score $p_k(\theta)$ can be calculated using $$p_k(\theta) = \frac{\sum_{v=1}^{h} f(F_v(\theta))}{k} \quad (27)$$
$$= \frac{p_{k-1}(\theta) \cdot (k-1) + f(F_k(\theta))}{k}$$

The model search and validation procedure builds a model for each pair of flow intensity measurements and then incrementally validates each model with new data points (step 735). After a finite period of time, if the confidence score $p_k(\theta)$ of a specific relationship is less than the predetermined threshold (step 740), the model for that relationship is considered to be invalid and the model is abandoned (step 745).

The method continues to test (steps 750, 755) the set of remaining models and uses the models (step 235) for fault detection. A robust model is more credible for fault detection than models exhibiting low confidence $p_k(\theta)$ scores. In a distributed transaction system environment such as Internet services, an endless stream of new flow intensity measurements is available for sequential testing.

Figure 7C:
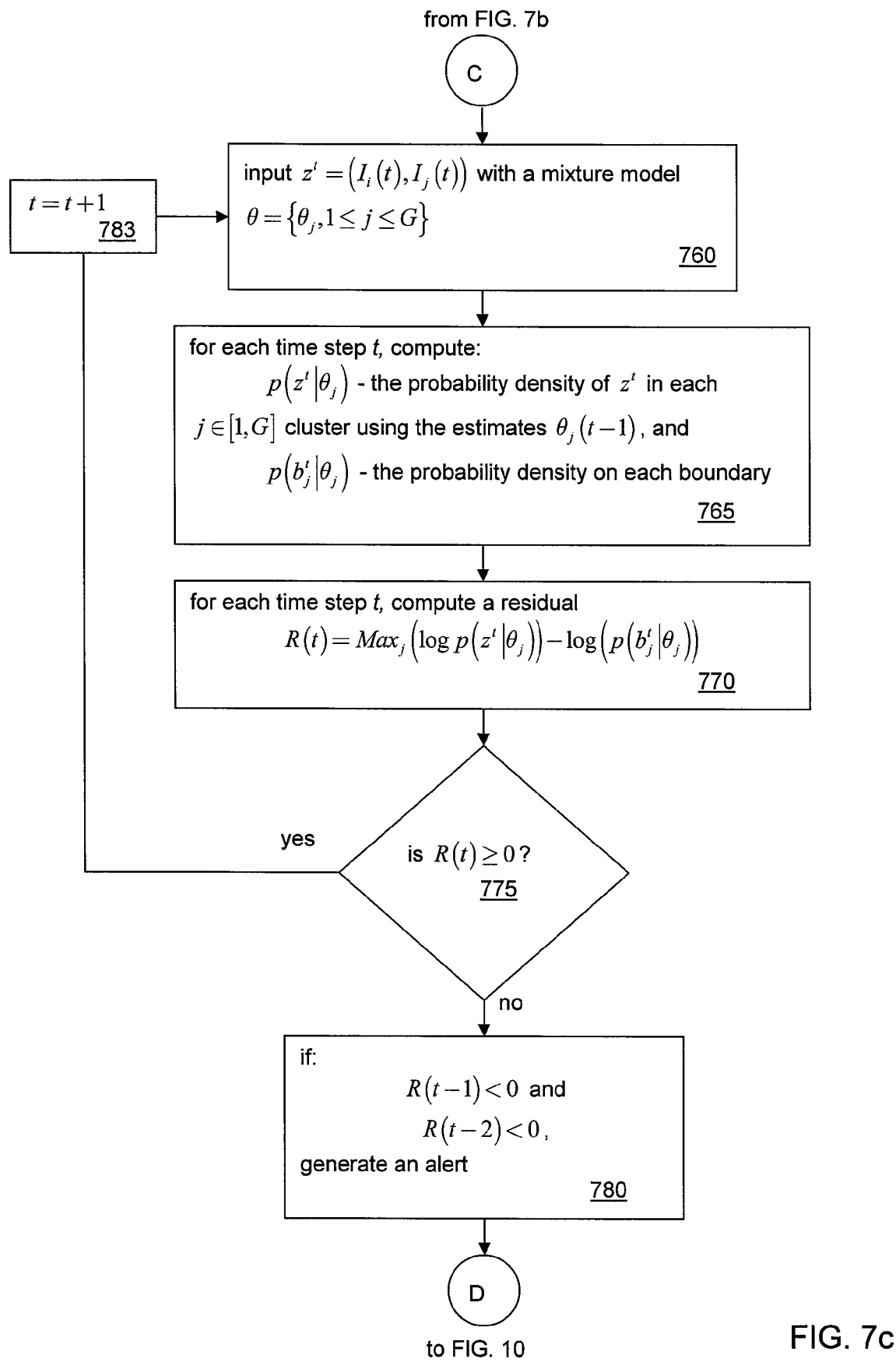

Gaussian Learning Model Residual Generation (FIG. 7c)

As discussed above, a fault occurrence inside the monitored component can affect the correlation between monitoring data measured at the input and output of that component. Fault detection is accomplished by tracking whether the probability density of the new measurement is less than the probability density on the boundaries corresponding to a threshold probability coverage, 99.5% for example.

If a data point $z^t$ is included by at least one ellipse, then $\exists j \in [1, G], p(z^t|\theta_j) - p(b_j^t|\theta_j) \geq 0$.

Conversely, if a data point $z^t$ is located outside of any ellipses, then $\forall j \in [1, G], p(z^t|\theta_j) - p(b_j^t|\theta_j) < 0$.

Therefore, the following criteria are used to determine outliers. For $j \in [1, G]$, if $\text{Max}_j(p(z^t|\theta_j) - p(b_j^t|\theta_j)) \geq 0$, the data point $z^t$ is considered as a normal observation (steps 760, 765). If not, the data point $z^t$ is an outlier. Since the probability density of a data point decreases exponentially with its distance to the center, the probability density of outliers are extremely low.

The logarithms of probability densities $p(z^t|\theta_j)$ and $p(b_j^t|\theta_j)$ are used to represent the residuals (step 770)

$$R(t) = \text{Max}_j(\log p(z^t|\theta_j)) - \log(p(b_j^t|\theta_j))), j \in [1, G]. \quad (28)$$

Based on the above learned Gaussian model, if a data point is located inside of at least one ellipse, $R(t) \geq 0$. For outliers, $R(t) < 0$ (steps 775, 783).

Since a Gaussian distribution has a large tail, the size of the resulting ellipses would become extremely large as they approach to have 100% probability coverage. Ellipses are predetermined to have a 99% probability coverage in order to have a reasonably compact size. That means the invention could result in 1% false positives of all data points.

For operational environments such as Internet services, a 1% false positive rate could lead to thousands of false positive cases. Therefore, the invention only generates an alert after three consecutive data points are detected as outliers (step 780). After a fault occurs, it is often persistent before it is eventually resolved, such as by a system administrator. Therefore, faults are likely to cause many consecutive outliers. Since noise resulting from uncertainties is usually independent, the possibility to have three consecutive false positives can be as low as $10^{-6}$.

Figure 9:
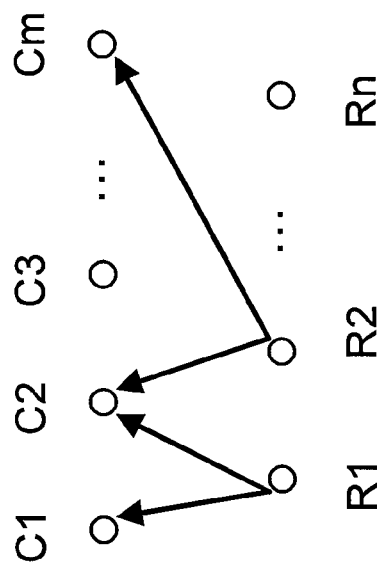
FIG. 9 is an exemplary correlation matrix between residuals, respective confidence scores and components.
Figure 10:
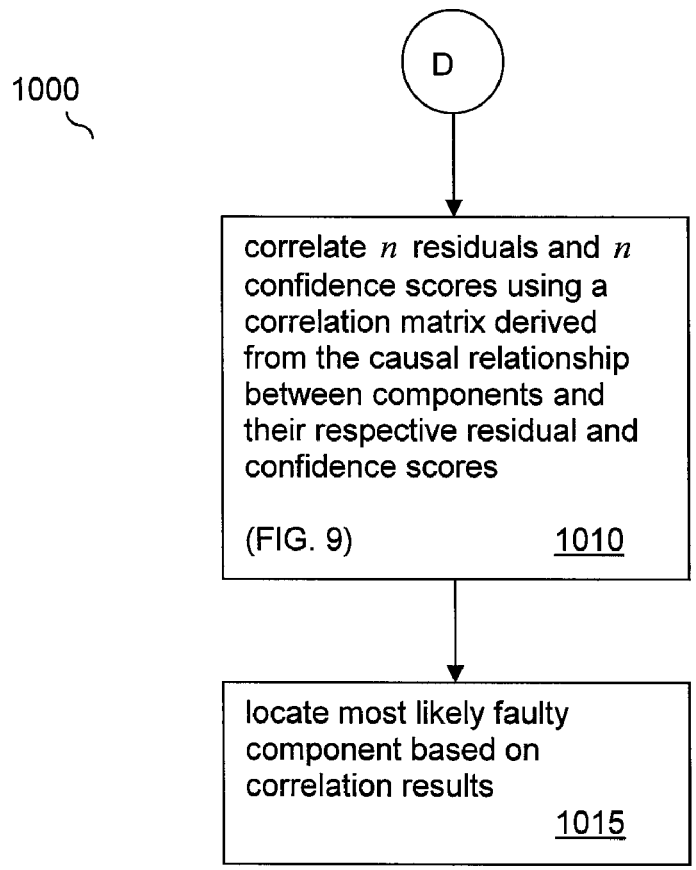
FIG. 10 is a block diagram of an exemplary correlation method according to the invention.

Learned Model Residual Correlation (FIGS. 9, 10)

The above analysis determines whether there are relationships among the measurements. The granularity of fault isolation depends on the flow intensity monitoring data that is collected from the distributed transaction system, and the models that are derived from the data. The greater the number of flow dynamic models that are derived and used (a bigger n) yields an isolation of faulty components having a finer granularity. However, a coarse level isolation (e.g. at the machine level) can still be useful in complex information systems.

The invention comprises a method that automates the process of fault isolation and identification. The residual correlation method 1000 is shown in FIG. 10. n flow dynamic models generate n residuals. While some faults may cause several residuals to be abnormal, other faults may leave little evidence of their existence in these residuals. Therefore, whether a specific fault can be detected is dependent on its impact on these residuals. If there are many residuals, a wide class of faults in the system can be detected.

Besides finding the location of a fault, identifying the type of fault is important. Residuals provide more information than their binary representation. Thorough analysis of residual information such as the shape of residual curves can be used to distinguish types of faults. Each residual variable is a time series.

Based on cause-effect analysis, and a system administrator's experience, a correlation between fault types and their corresponding symptoms can be derived from residuals. The residual correlation matrix 325 can be assembled describing the relationship between the residuals—rows; and the fault types—columns. The relationships between residuals $r_n(t)$ and confidence scores $p_k(\theta)$ from each learned model type (linear, Gaussian, etc.) and their monitored components are shown in FIG. 9.

For illustration purposes, a pointer indicates that one or more components $(C_1, C_2, \ldots, C_m)$ is monitored by a residual $(R_1, R_2, \ldots, R_n)$. The matrix shows the relationship between residuals $R_i$, observations $r_i(t)$, confidence scores $p_k(\theta_i)$, and components $C_m$. A confidence score $p_k(\theta_i)$ is updated once for each window with l time units. The variables in the table are at time $(k-1) \times l+1 \leq t \leq (k \times l)$. The matrix columns represent the same components $(C_1, C_2, \ldots, C_m)$ of the monitored system predefined by the preprocessor 315 (with system administrator knowledge). The rows represent the residuals $(R_1, R_2, \ldots, R_n)$, residual observations $(r_1(t), r_2(t), \ldots, r_n(t))$ and confidence scores $(p_k(\theta_1), p_k(\theta_2), \ldots (p_k(\theta_n)))$ computed by each respective model type (step 1010).

At time t, a binary value $r_i(t)$ is used to represent the abnormality of a residual $R_i(t)$. A residual observation of $r_i(t)=1$ indicates that the residual value $|R_i(t)|>\tau$. Conversely, a residual observation of $r_i(t)=0$ indicates that the residual value $|R_i(t)|\leq\tau$. Therefore, with all n residuals, an observation vector $O(t)=[r_1(t),r_2(t), \ldots, r_n(t)]^T$ can be defined. In no fault situations, $\|O(t)\|=0$.

As long as $\|O(t)\|\geq 1$, there are faults inside the predefined distributed transaction system segments. However, this decision rule can cause false positives if some models with relatively low confidence scores $p_k(\theta)$ are used in detection. These models can generate large residuals at certain observation times because the model itself does not capture the flow dynamics well enough, i.e. the large residual results from the inaccurate model itself rather than any faults. It is desired to have as many models as possible for fault analysis, and these unstable models can still capture some relationships. A weighted score s(t) determines whether the system is faulty at time t $$s(t) = \frac{\sum_{i=1}^{n} r_i(t) \cdot p_k(\theta_i)}{n}. \quad (29)$$

A threshold S is chosen to evaluate s(t). As long as s(t)>S, the system is faulty.

A residual observation $r_i(t)$ will be either a one or a zero. If a model with a high confidence score $p_k(\theta_j)$ generates an abnormal residual (i.e., $r_i(t)=1$), the weighted score s(t) will be high. If many models with relatively low confidence scores $p_k(\theta)$ generate abnormal residual observations $r_i(t)$ at the same time, the weighted score s(t) will also be high. In this case, the system is likely to be faulty because system and model uncertainties should not affect many residuals simultaneously, especially if some of residuals are independent.

If s(t)>S, the following Jaccard coefficient can be used to locate the faulty component $C_f$ $$C_f = \arg\max_j \frac{\sum_{i=1}^{n} (r_i(t) \cap C_{ij}) \cdot p_k(\theta_i)}{\sum_{i=1}^{n} (r_i(t) \cup C_{ij}) \cdot p_k(\theta_i)}. \quad (30)$$

Jaccard coefficients, which measure similarity, are measurements of asymmetric information on binary variables. Equation (30) identifies a component C which is maximally correlated with a residual observation $r_i(t)$ as the faulty component (step 1015). Equation (30) correlates the importance of residual observations $r_i(t)$ from high quality models than those from low quality models.

The invention serves as an advanced tool to interpret monitoring data and help system administrators use the information embedded in the residuals such as the shape of a curve, mean, etc., to locate and identify faults.

The notification and distribution manager 335 in conjunction with the end-user interface 340 provide a man-machine interface with a system administrator. The interface assembles a GUI for adjusting tuning parameters and threshold variable used in the learning models. The interface also allows for an annunciation means when a fault occurs in any of the monitored components 330. The interface can communicate over an established connection to a remote location for system administrator use.

The notification and distribution manager 335 routes information to multiple devices with two-way communication capability. It contains abstract notification rules that can select one or multiple relevant targets and notify them.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method for detecting faults in a distributed transaction system, said method comprising the steps of:
   measuring transaction flow intensity data at a plurality of monitoring points in the distributed transaction system with at least one of monitoring agents and tools during normal operation of the system;
   learning, with a processor of a computer a model of flow dynamics in the distributed transaction system using said transaction flow intensity data, said processor learning said model by deriving a relationship that characterizes a normal transaction flow intensity through a segment of the distributed transaction system by:
   calculating a simulated transaction flow intensity output using an observed flow intensity input;

comparing said simulated transaction flow intensity output with an observed flow intensity output to define an estimation error;

deriving a model parameter that minimizes said estimation error; and deriving a fitness score for said model parameter;

measuring real-time transaction flow intensity data at the plurality of monitoring points in the distributed transaction system with the at least one of monitoring agents and tools during real-time operation of the system; and comparing said real-time transaction flow intensity data to said model of flow dynamics with said processor to detect deviations from said model of flow dynamics, said deviations representing faults in said distributed transaction system.

2. The method according to claim 1 further comprising the step of validating said model of flow dynamics by inputting new transaction flow intensity data and new real-time transaction flow intensity data for said segment and performing sequential testing to said derived relationship to derive a fitness score and wherein said fitness score is used to evaluate the credibility of said derived relationship as a confidence score.

3. The method according to claim 2 wherein said deviations from said model of flow dynamics are detected by deriving a residual by tracking conformance between the real-time transaction flow intensity data measurements for said segment and an output of said model for that segment.

4. The method according to claim 1 further comprising the step of organizing said transaction flow intensity data with a preprocessor, to characterize said segment between two monitoring points wherein said segment comprises at least one component.

5. The method according to claim 3 further comprising the step of determining, with said processor, if said residual is abnormal if it is above a threshold.

6. The method according to claim 5 further comprising the step of correlating, with said processor, said confidence score with said residual to evaluate credibility of said residual when used to detect transaction system faults.

7. The method according to claim 6 further comprising the step of correlating, with said processor, said residual with its components to diagnose detected faults.

8. The method according to claim 1 wherein said model is a regression model.

9. The method according to claim 1 further comprising the steps of:

testing, with said processor, said model parameter using the real-time transaction flow intensity data, to validate said model parameter as a model based on whether said fitness score is above a predetermined fitness threshold;

calculating, with said processor, a confidence score for said model parameter by counting the number of times said model fitness score is higher than said fitness threshold over a predetermined series of time windows;

detecting faults with said processor using said model if said confidence score for said model is above a predetermined confidence threshold; and updating each said model confidence score over time, with said processor.

10. The method according to claim 9 further comprising the steps of:

calculating, with said processor, a difference between the real-time transaction flow intensity data and a calculated intensity output from said model, to derive a residual for said model;

deriving, with said processor, a residual threshold based upon past values of said residual; and comparing, with said processor, said residual against said residual threshold to detect said deviations.

11. The method according to claim 1 wherein said model is a Gaussian distribution model.

12. The method according to claim 1 wherein said processor learns said model by:

initializing a probability density function to approximate a real data distribution;

correlating pairs of flow intensity data measurements as a time series;

deriving a two-dimensional Gaussian distribution;

deriving a mixture parameter set;

tracking mass characteristics of historical transaction flow intensity measurements;

deriving a Gaussian mixture model having a probability density boundary; and deriving a fitness score over a predetermined period of time.

13. The method according to claim 12 further comprising the steps of:

testing, with said processor, said mixture model for said predetermined period of time using incoming transaction flow intensity data and said real-time transaction flow intensity data to validate said mixture model as a model based on whether said fitness score is above a predetermined fitness threshold for said predetermined period of time;

calculating, with said processor, a confidence score for said mixture model by counting the number of times said model fitness score is higher than said fitness threshold over a predetermined series of time windows;

detecting faults with said processor using said model if said confidence score for said model is above a predetermined confidence threshold; and updating said model confidence score over time with said processor.

14. The method according to claim 13 further comprising the steps of:

generating, with said processor, a residual for said mixture model, wherein said residual is the difference between a probability density of data points in a cluster and a probability density on a boundary;

comparing, with said processor, said residual to determine whether said residual is located within an ellipse defined by said model.

15. A method for detecting faults in a distributed transaction system, said method comprising the steps of:

measuring transaction flow intensity data at a plurality of monitoring points in the distributed transaction system with at least one of monitoring agents and tools during normal operation of the system;

organizing, with a preprocessor of a computer, said flow intensity data to characterize a plurality of segments between every two monitoring points wherein said segments comprise at least one component of the distributed transaction system;

deriving a model for each of said segments with a processor of the computer or another computer in communication with the computer;

calculating a fitness score for each of said models with said processor;

sequentially testing, with said processor, each of said models for a predetermined period of time using transaction flow intensity data to validate each of said models based on whether each of said models fitness score is above a predetermined fitness threshold for said predetermined period of time;

calculating, with said processor, a confidence score for each of said models by counting the number of times each of said model's fitness score is higher than said fitness threshold;

measuring real-time transaction flow intensity data at the plurality of monitoring points in the distributed transaction system with the at least one of monitoring agents and tools during real-time operation of the system;

comparing said real-time transaction flow intensity data to a model of flow dynamics with said processor to detect faults in the distributed transaction system if said confidence score for said model is above a predetermined confidence threshold;

updating each of said model's confidence score over time, with said processor;

deriving, with said processor, a residual for each of said models by tracking conformance between observed flow intensity measurements for each of said segments and an output of each of said models for that segment;

evaluating how credible said residual is for a model using said confidence score for said model if said model is used for fault detection; and correlating, with said processor, each of said residuals with its components to diagnose detected faults.

16. The method according to claim 15 wherein said models are linear regression models.

17. The method according to claim 15 wherein said models are Gaussian models.

18. A method for detecting faults in a distributed transaction system, said method comprising the steps of:

measuring transaction flow intensity data at a plurality of monitoring points in the distributed transaction system with at least one of monitoring agents and tools during normal operation of the system;

organizing, with a preprocessor of a computer, the transaction flow intensity data to characterize a plurality of segments between every two monitoring points, said segments comprising at least one component of the distributed transaction system;

deriving a model for each of said segments, with a processor of the computer or another computer in communication with the computer;

comparing a real-time transaction flow intensity data to a model of flow dynamics with said processor to detect faults in the distributed transaction system if a confidence score for a corresponding one of said models is above a predetermined confidence threshold;

sequentially testing, with said processor, each of said models for a predetermined period of time using transaction flow intensity data and said real-time transaction flow intensity data to validate each of said models based on whether a fitness score for said model is above a predetermined fitness threshold for said predetermined period of time;

deriving, with said processor, a residual for each of said models by tracking conformance between observed transaction flow intensity measurements for each of said segments and an output of each of said models for that segment; and correlating, with said processor, each of said residuals with its components to diagnose detected faults.

* * * * *